United States Patent
Lim et al.

(10) Patent No.: US 8,332,712 B2
(45) Date of Patent: Dec. 11, 2012

(54) APPARATUS AND METHOD FOR SUPPORTING HYBRID ARQ IN BROADBAND WIRELESS COMMUNICATION SYSTEM

(75) Inventors: Jun-Sung Lim, Seoul (KR); Jae-Weon Cho, Gwacheon-si (KR); Ho-Kyu Choi, Seongnam-si (KR); Jeong-Ho Park, Seoul (KR); Mi-Hyun Lee, Seongnam-si (KR); Chi-Woo Lim, Suwon-si (KR); Hee-Won Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 793 days.

(21) Appl. No.: 12/491,136

(22) Filed: Jun. 24, 2009

(65) Prior Publication Data
US 2010/0005358 A1 Jan. 7, 2010

(30) Foreign Application Priority Data

Jul. 4, 2008 (KR) .................. 10-2008-0064649
Aug. 28, 2008 (KR) .................. 10-2008-0084585

(51) Int. Cl.
*H04L 1/18* (2006.01)
(52) U.S. Cl. .................. 714/749; 714/748; 714/751
(58) Field of Classification Search .................. 714/749, 714/748, 751, 746, 701, 708, 776; 370/282, 370/382
See application file for complete search history.

(56) References Cited

U.S. PATENT DOCUMENTS

| 6,735,180 | B1* | 5/2004 | Malkamaki et al. | 370/282 |
| 7,869,396 | B2* | 1/2011 | Chun et al. | 370/328 |
| 7,978,635 | B2* | 7/2011 | Tsai et al. | 370/282 |
| 2003/0191844 | A1* | 10/2003 | Meyer et al. | 709/227 |

FOREIGN PATENT DOCUMENTS

| KR | 10-2007-0011030 A | 1/2007 |
| KR | 10-2007-0073608 A | 7/2007 |
| KR | 10-2007-0107577 A | 11/2007 |

* cited by examiner

*Primary Examiner* — Fritz Alphonse
(74) *Attorney, Agent, or Firm* — Jefferson IP Law, LLP

(57) ABSTRACT

An apparatus and method for supporting Hybrid Automatic Repeat reQuest (HARQ) in a broadband wireless communication system are provided. A method of performing HARQ by a Mobile Station (MS) in a wireless communication system includes receiving a control message including resource allocation information, decoding the control message, if the decoding is successful, determining whether a previous control message is lost, and if the previous control message is lost, transmitting one of a null signal and a specific indicator through a response channel.

18 Claims, 15 Drawing Sheets

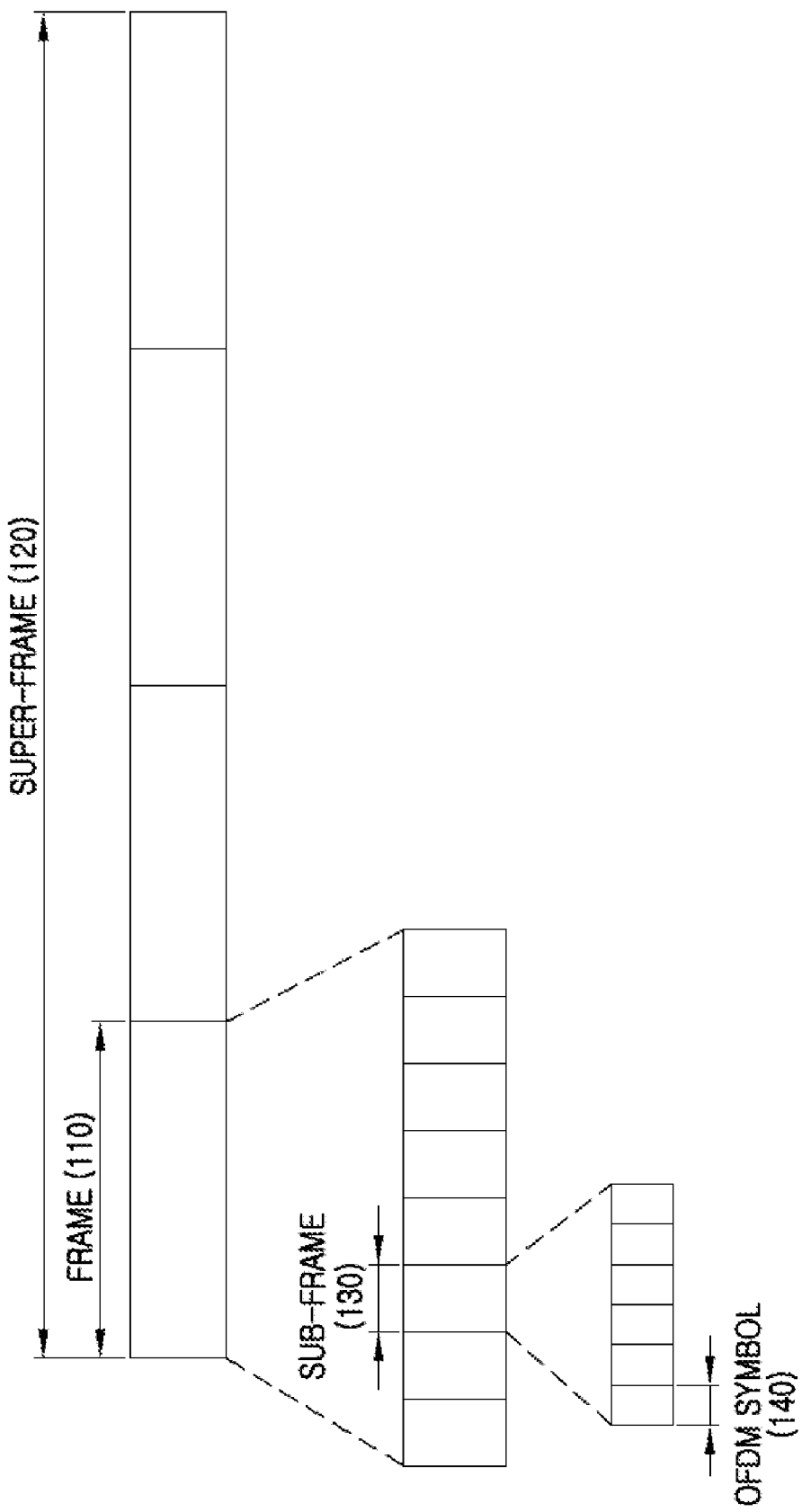

APPARATUS AND METHOD FOR SUPPORTING HYBRID ARQ IN BROADBAND WIRELESS COMMUNICATION SYSTEM

PRIORITY

This application claims the benefit under 35 U.S.C. §119 (a) of a Korean patent application filed in the Korean Intellectual Property Office on Jul. 4, 2008 and assigned Serial No. 10-2008-0064649 and a Korean patent application filed in the Korean Intellectual Property Office on Aug. 28, 2008 and assigned Serial No. 10-2008-0084585, the entire disclosures of each of which are hereby incorporated by reference.

BACKGROUND OF THE INVENTION

1. Field of the Invention

The present invention relates to an apparatus and method for performing Hybrid Automatic Repeat reQuest (HARQ) in a broadband wireless communication system. More particularly, the present invention relates to an apparatus and method for determining whether a Mobile Station (MS) receives control information when HARQ is performed and, upon detecting a failure in receiving the control information, for recovering the failure in the broadband wireless communication system.

2. Description of the Related Art

Many wireless communication techniques are being proposed to achieve high-speed mobile communication. Among them, an Orthogonal Frequency Division Multiplexing (OFDM) scheme is being accepted as one of the more promising techniques for a next generation wireless communication. The OFDM scheme is expected to be widely used in future wireless communication systems, and is currently being considered in the Institute of Electrical and Electronics Engineers (IEEE) 802.16 standard, on which a Wireless Metropolitan Area Network (WMAN) system, known as the 3.5 generation technology, is based.

The OFDM scheme uses multi-carriers for data transmission. That is, the OFDM scheme is one type of Multi Carrier Modulation (MCM) scheme in which a serially input symbol stream is converted into parallel symbols and the parallel symbols are transmitted by being modulated into a plurality of orthogonal sub-carriers, i.e., a plurality of sub-channels.

There has been proposed a method in which radio resources are persistently allocated to a Mobile Station (MS) in a broadband wireless communication system based on the OFDM. The persistent resource allocation method is a technique for decreasing an overhead generated when resource allocation information (or a resource allocation message) is transmitted to the MS in every frame (or sub-frame). That is, a Base Station (BS) persistently allocates a specific resource to an MS for which a service (e.g., a Voice over Internet Protocol (VoIP) service, etc.) periodically generating traffic is provided. Thereafter, the MS performs communication by continuously using the persistently allocated resources without having to evaluate the resource allocation information until the persistently allocated resource is changed or released. In this case, the BS does not have to transmit the resource allocation information for the MS in every frame.

Meanwhile, to improve reliability of data transmission, most communication systems use a Hybrid Automatic Repeat reQuest (HARQ) scheme in which a Forward Error Correction (FEC) scheme and an Automatic Repeat reQuest (ARQ) scheme are properly combined. The HARQ scheme corrects an error from a received packet by using an error correction code, and uses an error detection code (e.g., a Cyclic Redundancy Check (CRC) code) of the error corrected packet to detect a retransmission request. In addition, upon receiving a retransmission packet, decoding is performed by combining a currently received packet with a previously received packet. As a result, an additional gain (e.g., a coding gain and an increased Signal to Noise Ratio (SNR)) may be obtained.

As described above, a connection established using HARQ may lead to a problem in which retransmission occurs continuously if link quality is poor. To address this problem, there is ongoing research to persistently allocate resources in the HARQ scheme. Hereinafter, a scheme in which the HARQ scheme and the persistent resource allocation scheme are combined is defined as a "synchronous HARQ" scheme.

The synchronous HARQ scheme is a scheme in which resources of a response signal and a retransmission packet are persistently allocated according to resources used in a $1^{st}$ transmission. That is, when using the synchronous HARQ scheme, a BS allocates resources only for the $1^{st}$ transmission, and does not allocate additional resources for the response signal and the retransmission packet. In this case, the BS does not need to transmit allocation information regarding the resources for the retransmission packet and the response signal to the MS. However, if resource allocation information of the $1^{st}$ transmission may not be received, a receiving end may not receive subsequent retransmission packets.

Further, a position of a resource used for retransmission will inevitably be changed. In this case, the changed resource position should be reported to a corresponding MS. A serious problem may occur if the MS fails to receive resource change information.

For example, for DownLink (DL) transmission, upon detecting a failure in receiving the resource change information, the MS decodes a signal by using a packet at an incorrect resource position (i.e., garbage combining). In this case, the MS may not be able to recover the signal, or may not be able to receive all retransmission packets generated afterwards. For UpLink (UL) transmission, when the MS transmits a UL packet at an incorrect resource position, the BS cannot recover a signal of the MS. In addition, the UL packet transmitted at the incorrect position acts as fatal interference to another MS.

Consequently, if the MS fails to receive control information, there is an increase in a residual packet error rate that is defined as a probability that data reception remains impossible even after a maximum number of retransmissions are performed. This acts as a factor for deteriorating an overall system throughput. The same problem occurs not only in the synchronous HARQ but also in normal HARQ (or asynchronous HARQ).

SUMMARY OF THE INVENTION

An aspect of the present invention is to address at least the above-mentioned problems and/or disadvantages and to provide at least the advantages described below. Accordingly, an aspect of the present invention is to provide an apparatus and method for reliably performing Hybrid Automatic Repeat reQuest (HARQ) in a broadband wireless communication system.

Another aspect of the present invention is to provide an apparatus and method for preventing performance deterioration caused by a failure in receiving control information, when HARQ is performed in a broadband wireless communication system.

Another aspect of the present invention is to provide an apparatus and method in which a Base Station (BS) determines whether a Mobile station (MS) receives control information, when HARQ is performed in a broadband wireless communication system.

Another aspect of the present invention is to provide an apparatus and method in which, if an MS fails to receive control information, a BS allocates resources for retransmission and transmits resource allocation information for retransmission to the MS, when HARQ is performed in a broadband wireless communication system.

Another aspect of the present invention is to provide an apparatus and method in which, if an MS fails to receive control information, a BS transmits an indicator for indicating a garbage packet to the MS, when HARQ is performed in a broadband wireless communication system.

Another aspect of the present invention is to provide an apparatus and method in which an MS performs decoding on packets other than a garbage packet according to information provided from a BS, when HARQ is performed in a broadband wireless communication system.

Another aspect of the present invention is to provide an apparatus and method for reliably detecting a null signal received through a response channel, when HARQ is performed in a broadband wireless communication system.

Another aspect of the present invention is to provide an apparatus and method for detecting a null signal by combining at least two received response channel signals, when HARQ is performed in a broadband wireless communication system.

Another aspect of the present invention is to provide an apparatus and method for determining whether an MS fails to receive previous control information, when HARQ is performed in a broadband wireless communication system.

Another aspect of the present invention is to provide an apparatus and method for transmitting a null signal or an agreed indicator to a BS if an MS recognizes a failure in receiving previous control information, when HARQ is performed in a broadband wireless communication system.

Another aspect of the present invention is to provide an apparatus and method for determining whether an MS receives control information, by combining at least two response channel signals in a broadband wireless communication system.

In accordance with an aspect of the present invention, a method of performing HARQ by an MS in a wireless communication system is provided. The method includes receiving a control message including resource allocation information, decoding the control message, if the decoding is successful, determining whether a previous control message is lost, and if the previous control message is lost, transmitting one of a null signal and a specific indicator through a response channel.

In accordance with another aspect of the present invention, a method of performing HARQ by a BS in a wireless communication system is provided. The method includes determining whether a null signal is received continuously two or more times through a response channel, if the null signal is received continuously two or more times, combining at least two received response channel signals, performing a null decision by using the combining value, and if a null is determined in the null decision, determining that a previously transmitted control message is lost.

In accordance with another aspect of the present invention, an MS apparatus in a wireless communication system is provided. The apparatus includes a receiver for receiving a control message including resource allocation information and for decoding the control message, a controller for determining whether a previous control message is lost if the decoding is successful, and a feedback transmitter for transmitting one of a null signal and a specific indicator through a response channel if the previous control message is lost.

In accordance with another aspect of the present invention, a BS apparatus in a wireless communication system is provided. The apparatus includes a feedback receiver for determining whether a null signal is received continuously two or more times through a response channel, and a controller for combining at least two received response channel signals if the null signal is received continuously two or more times, for performing a null decision by using the combining value, and for determining that a previously transmitted control message is lost if a null is determined in the null decision.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 1 illustrates a frame structure of a broadband wireless communication system according to an exemplary embodiment of the present invention;

Throughout the drawings, it should be noted that like reference numbers are used to depict the same or similar elements, features and structures

DETAILED DESCRIPTION OF EXEMPLARY EMBODIMENTS

Figure 2A:
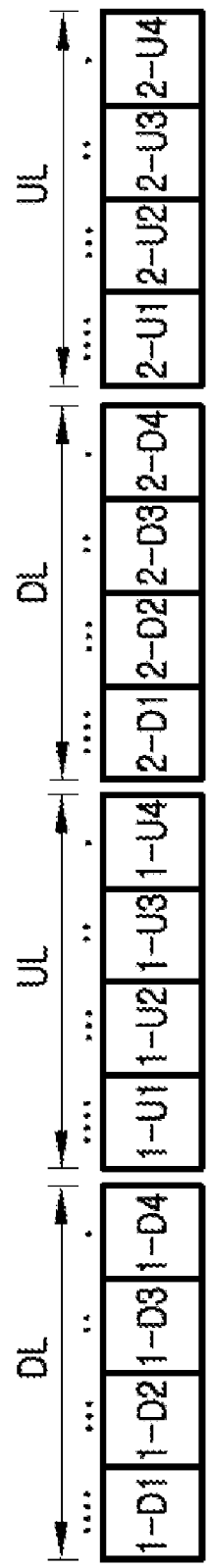
FIGS. 2A-2C illustrate examples of frame usage based on synchronous Hybrid Automatic Repeat reQuest (HARQ) in a broadband wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method for preventing performance deterioration from occurring when a Mobile Station (MS) fails to receive control information (e.g., resource allocation information, resource change information, etc.) where Hybrid Automatic Repeat reQuest (HARQ) is performed in a broadband wireless communication system. More specifically, exemplary embodiments of the present invention provide a method for determining whether an MS receives control information, and upon detecting a failure in receiving the control information, for recovering the control information. Exemplary embodiments of the present invention may apply to a communication system using an HARQ scheme. An Institute of Electrical and Electronics Engineers (IEEE) 802.16m or IEEE 802.16e standard-based broadband wireless communication system will be described as an example in the following description.

The HARQ scheme includes an asynchronous HARQ scheme and a synchronous HARQ scheme. Although exemplary embodiments of the present invention will be described by taking the synchronous HARQ scheme as an example, it will be apparent that the present invention can equally apply to the asynchronous HARQ.

When using the synchronous HARQ scheme, a Base Station (BS) transmits, to a Mobile Station (MS), resource allocation information for a $1^{st}$ transmitted HARQ packet. Thereafter, the BS may transmit a retransmission packet by using the same resource without additional control information. In addition, if a position of resource changes at retransmission, the BS transmits resource change information to the MS, and thereafter may transmit the retransmission packet by using a changed resource without additional control information.

In the following description, "control information", "MAP Information Element (IE)", "MAP information" and "resource allocation information" are used in the same meaning, and a "control message" and a "MAP message" are used in the same meaning.

FIG. 1 illustrates a frame structure of a broadband wireless communication system according to an exemplary embodiment of the present invention.

Referring to FIG. 1, the frame structure is a hierarchical structure consisting of a super-frame 120, a frame 110, and a sub-frame 130. For example, the super-frame 120 having a length of 20 milliseconds (msec) may include 4 frames 110 each having a length of 5 msec. Each frame may include 8 sub-frames. If one frame 110 includes K sub-frames 130, n sub-frames 130 may be used for DownLink (DL) communication and K-n sub-frames 130 may be used for UpLink (UL) communication. Each sub-frame 130 includes a plurality of Orthogonal Frequency Division Multiplexing (OFDM) symbols 140.

A super-frame header is transmitted in every super-frame 120. The super-frame header may include a preamble (or a synch channel) for system synchronization, a Broadcast CHannel (BCH), etc. The preamble may be designed with one or more OFDM symbols, and may be transmitted in every super-frame 120. An MS may use the preamble for system synchronization and for identification of a BS currently connected to the MS. Downlink Channel Descriptor (DCD)/Uplink Channel Descriptor (UCD) information is used in a conventional system (e.g., an IEEE 802.16e standard based system), and the BCH may include any control information which changes with a shorter period between the DCD and the UCD. A period of the BCH may be determined according to control information to be included in the BCH. A MAP message including resource allocation information is included in the DL sub-frame 130, and may be transmitted with one or more sub-frame periods.

Figure 2B:
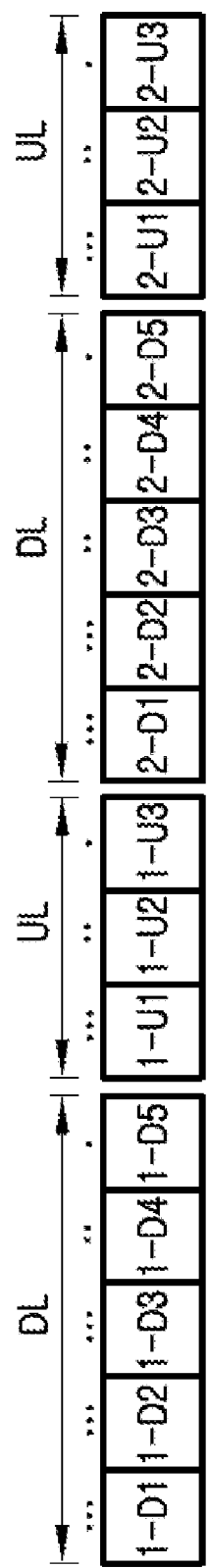
Figure 2C:
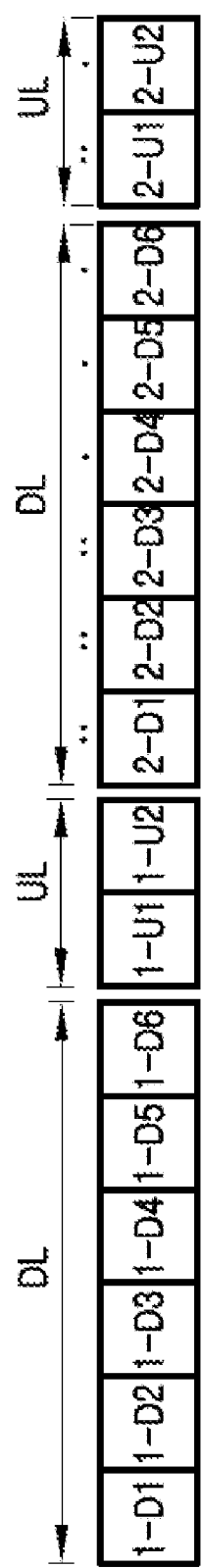

When using the frame structure of FIG. 1, resources are used for a $1^{st}$ transmission, an ACKnowledgement (ACK)/Negative-ACK (NACK) transmission, and a retransmission according to a synchronous HARQ scheme as illustrated in FIGS. 2A-2C.

FIGS. 2A-2C illustrate examples of frame usage based on synchronous Hybrid Automatic Repeat reQuest (HARQ) in a broadband wireless communication system according to an exemplary embodiment of the present invention.

More specifically, FIG. 2A illustrates a case where a ratio of DL communication and UL communication (hereinafter, simply referred to as a DL/UL ratio) is 4:4. FIG. 2B illustrates a case where the DL/UL ratio is 5:3. FIG. 2C illustrates a case where the DL/UL ratio is 6:2. In FIGS. 2A, 2B, and 2C, sub-frames indicated by the same number of dots represent inter-locked sub-frames depending on a $1^{st}$ transmission.

Referring to FIG. 2A, ACK/NACK for a $1^{st}$ transmitted packet at a sub-frame 1-D1 is transmitted at a sub-frame 1-U1. A retransmission packet for the $1^{st}$ transmitted packet is transmitted at a sub-frame 2-D1. ACK/NACK for the retransmission packet is transmitted at a sub-frame 2-U1. In FIGS. 2B and 2C, since the number of sub-frames used for DL communication is not the same as the number of sub-frames used for UL communication, a plurality of DL sub-frames may be mapped into one UL sub-frame. A mapping pattern may be determined according to a system design rule.

An exemplary embodiment of the present invention described below focuses on DL communication. However, the present invention equally applies to UL communication.

Figure 3:
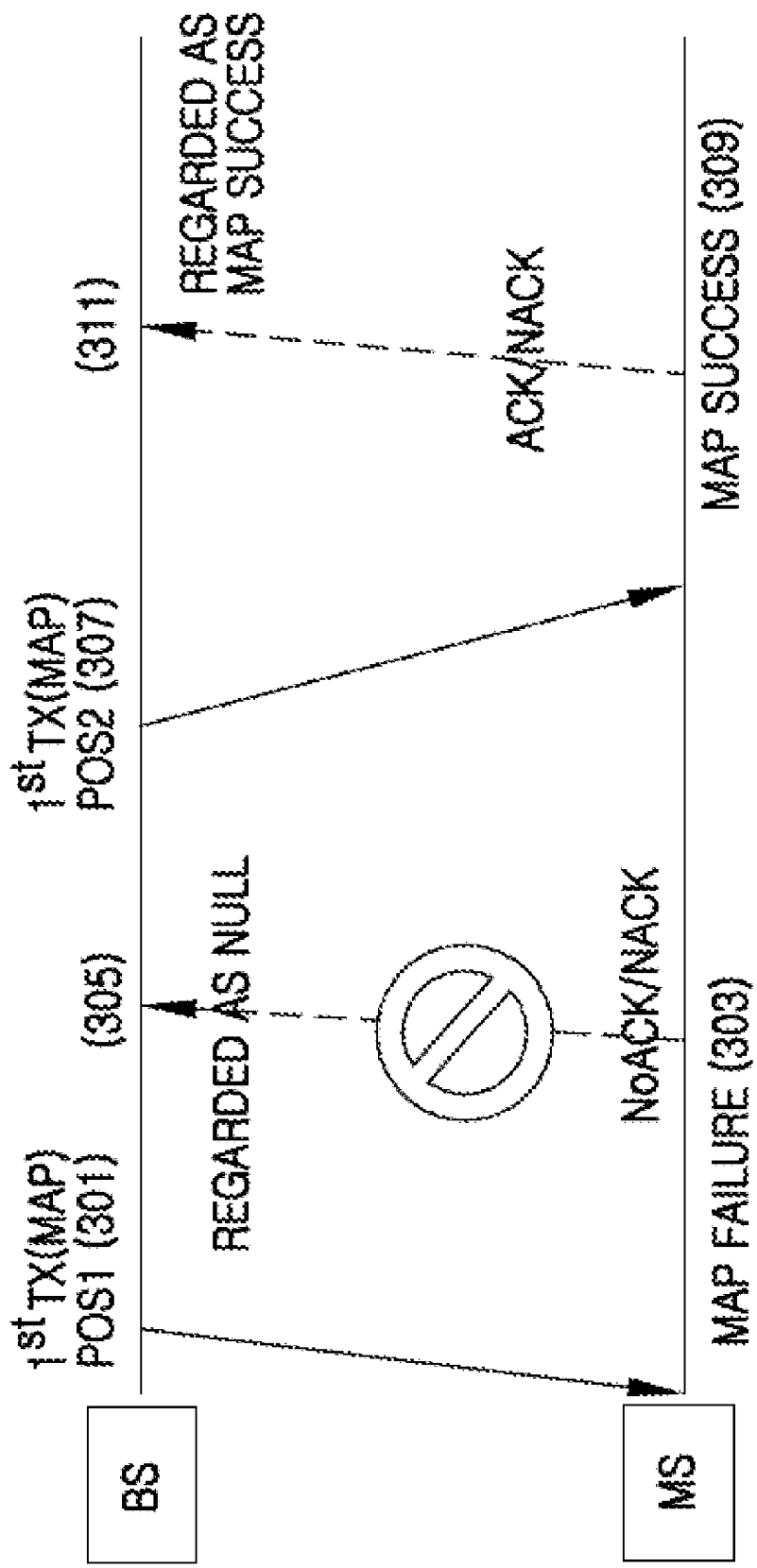
FIG. 3 illustrates a process of performing synchronous HARQ in a broadband wireless communication system according to an exemplary embodiment of the present invention.

FIG. 3 illustrates a process of performing synchronous HARQ in a broadband wireless communication system according to an exemplary embodiment of the present invention. In particular, in the process of FIG. 3, a BS recognizes that an MS fails to receive control information by using feedback information for a data packet, and then the BS controls retransmission according to the recognition result.

Referring to FIG. 3, in step 301, the BS allocates a resource for a $1^{st}$ transmission packet (or sub-packet), and transmits resource allocation information to the MS. Further, the BS transmits the $1^{st}$ transmission packet to the MS by using the resource. In this case, a position of the resource allocated for the $1^{st}$ transmission packet is assumed to be a position 1 (POS 1).

In step 303, the MS decodes the resource allocation information (e.g., MAP IE) received from the BS. It is assumed herein that the MS fails to decode the resource allocation information. If the reception of the resource allocation information fails, the MS may not receive a data packet, and thus does not transmit any feedback signal to the BS. That is, a null is transmitted through a response channel.

In step 305, the BS predicts whether the MS receives the resource allocation information by using a feedback signal from the MS. If an ACK signal for the data packet is received from the MS, the BS determines that the MS has correctly received the packet, and thus stops a retransmission process performed on the packet. Otherwise, if a NACK signal is received from the MS, the BS regards that the MS fails to decode the packet but successfully receives the resource allocation information. In this case, the BS transmits a retransmission packet generated afterwards by using a previously allocated resource at the POS 1 after a specific time elapses without additional control information.

If no feedback signal (i.e., an ACK or a NACK) is received from the MS as shown in FIG. 3, i.e., if a null is received, the BS regards that the MS fails to receive the resource allocation information. As described above, when using the synchronous HARQ scheme, a UL response channel (i.e., an ACK CHannel (ACKCH)) is automatically allocated according to a resource allocated to the data packet. That is, if the reception of the resource allocation information for the data packet fails, the MS may not know a corresponding response channel and thus may not transmit a feedback response signal to the BS. Therefore, if a feedback signal for the data packet is not received, it may be regarded that the MS fails to receive the control information.

In step 307, the BS allocates a resource for a retransmission packet after a specific time elapses, and transmits resource allocation information to the MS. Further, the BS transmits the retransmission packet to the MS by using the allocated resource. In this case, a position of the resource allocated for the retransmission packet is assumed to be a position 2 (i.e., POS 2). The POS 1 and the POS 2 may be identical or different.

In step 309, the MS decodes the resource allocation information received from the BS. It is assumed herein that the MS has successfully received the resource allocation information.

If the resource allocation information is successfully received, the MS can know a position of the retransmission packet. Thus, the MS receives and decodes the retransmission packet at that position. Then, the MS transmits a feedback signal (i.e., an ACK or a NACK) to the BS according to the decoding result.

In step 311, the BS predicts whether the MS receives the resource allocation information by using the feedback signal from the MS. In this case, since the feedback signal is received from the MS, the BS regards that the MS has successfully received the resource allocation information, and thus determines whether retransmission is necessary according to the feedback signal.

The aforementioned process of FIG. 3 considers a case where the MS does not feed back a response (i.e., an ACK) for the resource allocation information (e.g., MAP information). A future system may consider a case where the MS feeds back the response for the resource allocation information to the BS, which will be described below according to an exemplary embodiment of the present invention.

Figure 4:
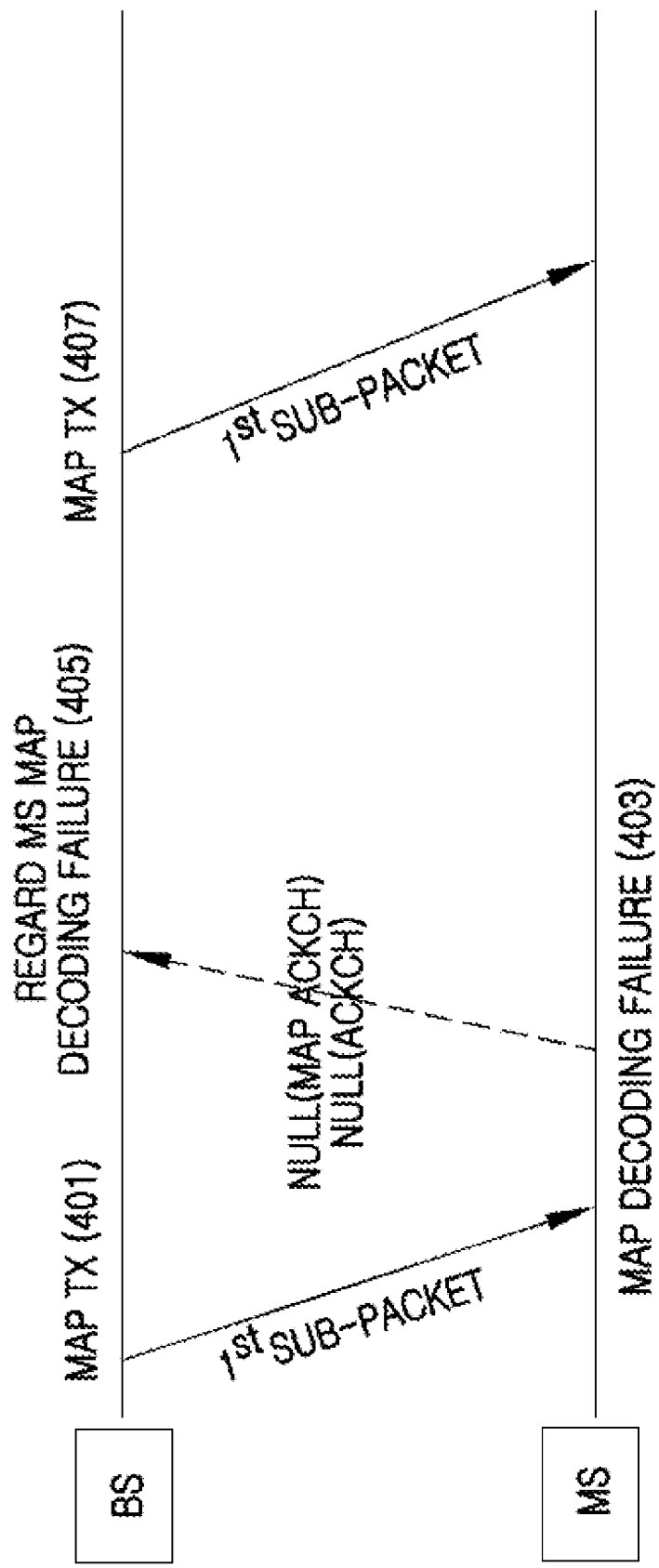
FIG. 4 illustrates a process of performing synchronous HARQ in a broadband wireless communication system according to an exemplary embodiment of the present invention.

FIG. 4 illustrates a process of performing synchronous HARQ in a broadband wireless communication system according to an exemplary embodiment of the present invention. In particular, in the process of FIG. 4, a BS recognizes that an MS fails to receive control information by using resource allocation information and feedback information for a data packet, and then the BS controls transmission according to the recognition result.

Referring to FIG. 4, in step 401, the BS allocates a resource for a $1^{st}$ transmission packet (or sub-packet), and transmits resource allocation information to the MS. Further, the BS transmits the $1^{st}$ transmission packet to the MS by using the resource.

In step 403, the MS decodes the resource allocation information (e.g., MAP IE) received from the BS. It is assumed herein that the MS fails to decode the resource allocation information. If the reception of the resource allocation information fails, the MS does not transmit any feedback signal to the BS. As illustrated, a null is transmitted through a MAP response channel (i.e., a MAP ACKCH) and a data response channel (an ACKCH). Herein, the null implies that there is no feedback signal.

In step 405, the BS predicts whether the MS receives the resource allocation information by using a feedback signal received through the MAP response channel (i.e., a MAP ACKCH) and the data response channel (i.e., an ACKCH). In this case, a null is received through the MAP response channel (i.e., a MAP ACKCH) and the data response channel (i.e., an ACKCH), and thus the BS regards that the MS fails to receive the resource allocation information.

In step 407, the BS allocates a resource for a retransmission packet after a specific time elapses, and transmits resource allocation information to the MS. Further, the BS transmits the retransmission packet to the MS by using the allocated resource. The subsequent steps are the same as those of FIG. 3, and thus detailed descriptions thereof will be omitted.

As described above, by allocating an additional UL response channel (i.e., an UL ACKCH), the BS may receive a feedback (i.e., an ACK or a null) indicating whether the resource allocation information (i.e., MAP information) is received from the MS. Therefore, by using a feedback signal (i.e., an ACK or a NACK) for a data packet and a feedback signal (i.e., an ACK or a null) for control information, the BS may predict whether the MS receives the control information. In other words, the BS regards that the MS fails to receive the control information in any one of the following cases:

A. when the feedback signal for the data packet is not received;

B. when the feedback signal for the control information is not received; and

C. when the two cases both occur.

Figure 5:
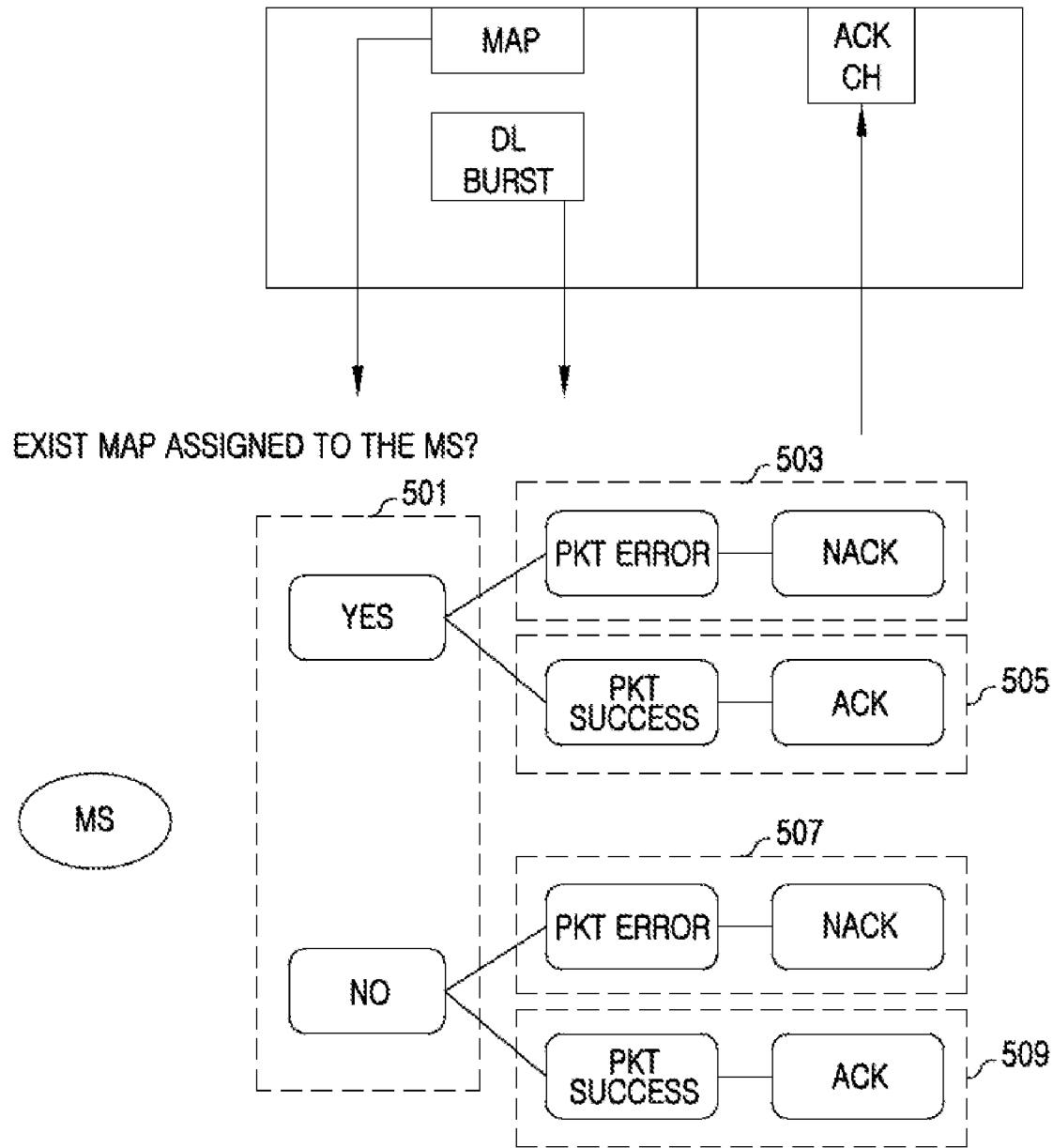
FIG. 5 illustrates a signaling process based on HARQ in a broadband wireless communication system according to an exemplary embodiment of the present invention.

FIG. 5 illustrates a signaling process based on HARQ in a broadband wireless communication system according to an exemplary embodiment of the present invention.

Referring to FIG. 5, this is a case where only a response channel (i.e., an ACKCH) for a data packet is used. First, an MS decodes a MAP message to determine whether resource allocation information is received by the MS itself in step 501.

If the resource allocation information is received, the MS receives and decodes a packet (i.e., a DL burst) at a position indicated by the resource allocation information, and if the decoding result shows that an error exists in the packet, transmits a NACK to a BS through the response channel (i.e., an ACKCH) in step 503. Otherwise, if the decoding result shows that no error exists in the packet, the MS transmits an ACK to the BS through the response channel in step 505.

Meanwhile, if the decoding of the MAP message fails, the MS receives and decodes a packet (i.e., a DL burst) at a pre-allocated position, and if the decoding result shows that an error exists in the packet, transmits a NACK to the BS through the response channel in step 507. Otherwise, if the decoding result shows that no error exists in the packet, the MS transmits an ACK to the BS through the response channel in step 509.

Figure 6:
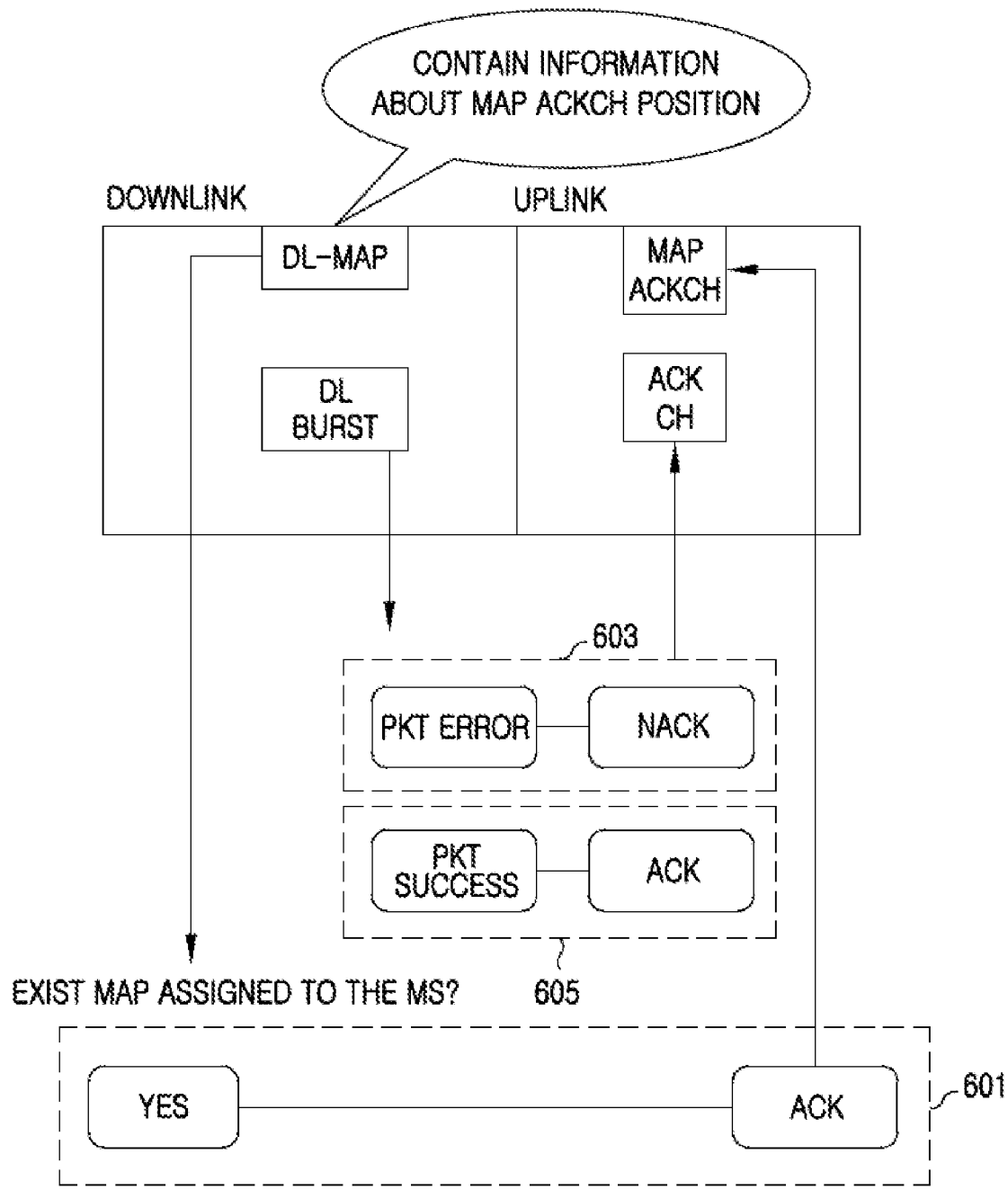
FIG. 6 illustrates a signaling process based on HARQ in a broadband wireless communication system according to an exemplary embodiment of the present invention.

FIG. 6 illustrates a signaling process based on HARQ in a broadband wireless communication system according to an exemplary embodiment of the present invention.

Referring to FIG. 6, this is a case where a response channel for a data packet and a response channel for control information are used together. First, an MS decodes a MAP message to determine whether resource allocation information is received by the MS itself, and if the resource allocation information is received, transmits an ACK to a BS through a MAP response channel (i.e., a MAP ACKCH) in step 601. If the decoding of the MAP message fails, no signal is transmitted through the MAP response channel. As illustrated, a DL-MAP message may include position information for the MAP response channel.

If the resource allocation information is received, the MS receives and decodes a packet (i.e., a DL burst) at a position indicated by the resource allocation information, and if the decoding result shows that an error exists in the packet, transmits a NACK to the BS through the response channel (i.e., an ACKCH) in step 603. Otherwise, if the decoding result shows that no error exists in the packet, the MS transmits an ACK to the BS through the response channel in step 605.

Figure 7:
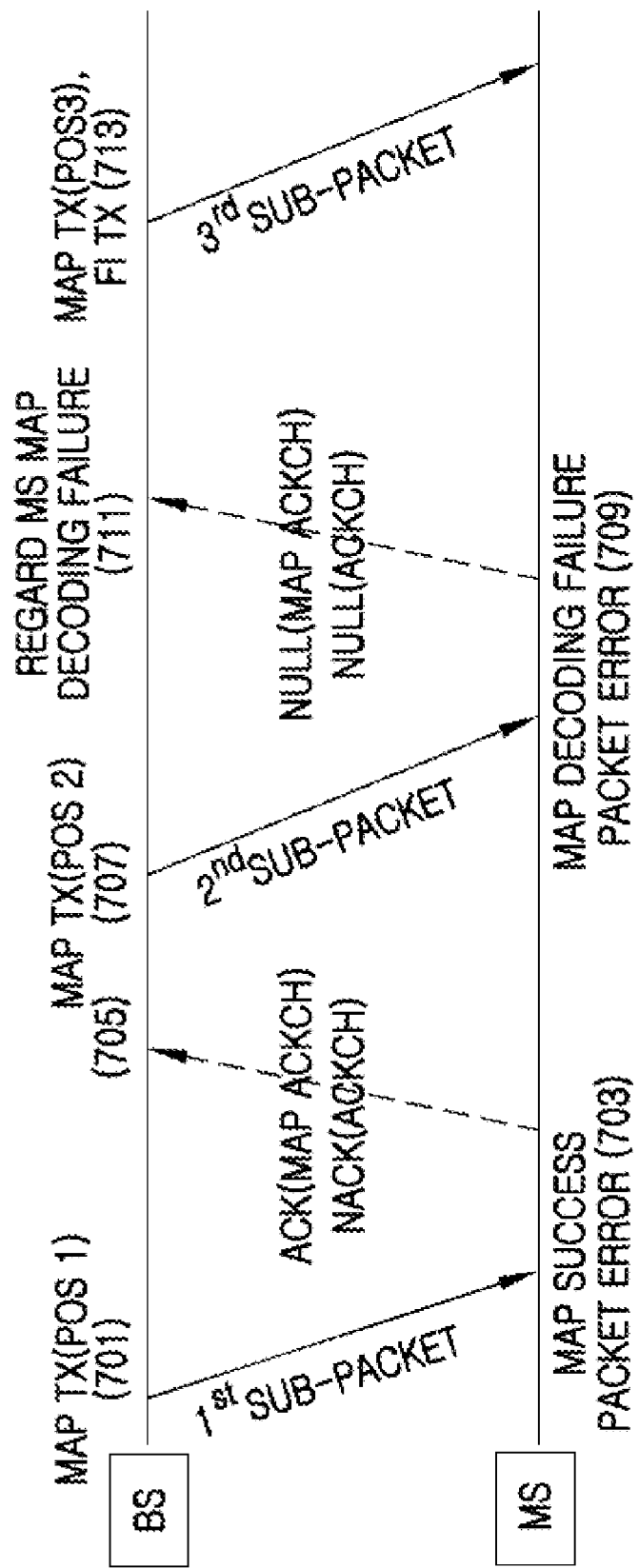
FIG. 7 illustrates a process of performing synchronous HARQ in a broadband wireless communication system according to an exemplary embodiment of the present invention.

FIG. 7 illustrates a process of performing synchronous HARQ in a broadband wireless communication system according to an exemplary embodiment of the present invention. In particular, in the process of FIG. 7, a BS recognizes that an MS fails to receive control information by using feedback information from the MS, and then the BS transmits indication information for controlling HARQ combining of the MS according to the recognition result.

Referring to FIG. 7, in step 701, the BS allocates a resource for a $1^{st}$ transmission packet (or sub-packet), and transmits resource allocation information to the MS. Further, the BS transmits the $1^{st}$ transmission packet to the MS by using the resource. In this case, a position of the resource allocated for the $1^{st}$ transmission packet is assumed to be a position 1 (POS 1).

In step 703, the MS decodes the resource allocation information received from the BS. It is assumed herein that the MS successfully decodes the resource allocation information. Thus, the MS transmits an ACK to the BS through a MAP response channel (i.e., a MAP ACKCH). Further, the MS receives and decodes the $1^{st}$ transmission packet at the position (i.e., POS 1) indicated by the resource allocation information, and transmits a feedback signal through a response channel (i.e., an ACKCH) according to the decoding result. It is assumed herein that the MS fails to decode the $1^{st}$ transmission packet, and thus the MS transmits a NACK to the BS through the response channel.

In step 705, since an ACK is received through the MAP response channel and a NACK is received through a data response channel, the BS determines to retransmit the $1^{st}$ transmission packet. In this case, it is determined that a resource for a retransmission packet needs to be changed.

In step 707, the BS allocates the resource for the retransmission packet, and transmits resource allocation information to the MS. Further, the BS transmits the retransmission packet to the MS by using the allocated resource. In this case, a position of the resource allocated for the retransmission packet is assumed to be a position 2 (i.e., POS 2).

In step 709, the MS decodes the resource allocation information received from the BS. It is assumed herein that the MS fails to receive the resource allocation information. Therefore, a null is transmitted through the MAP response channel. Since the MS cannot know a resource position changed due to a failure in the decoding of the resource allocation information, the MS receives and decodes a packet at a known position. In this case, erroneous packets are HARQ-combined in the decoding process performed by the MS, and as a result, the decoding fails. Therefore, the MS transmits a NACK to the BS through a previously allocated data response channel. Eventually, a null is transmitted through the changed response channel.

In step 711, the BS predicts whether the MS receives the resource allocation information by using the feedback signal received through the MAP response channel (i.e., a MAP ACKCH) and the data response channel (i.e., an ACKCH). In this case, since a null is received through the MAP response channel (i.e., a MAP ACKCH) and the data response channel, the BS regards that the MS fails to receive the resource allocation information.

In step 713, the BS re-allocates a resource for the retransmission packet, and transmits resource allocation information to the MS. In this case, the BS transmits to the MS a Fault Indicator (FI) for indicating that the MS has received a garbage packet. Further, the BS transmits the retransmission packet to the MS by using the allocated resource. In this case, a position of the resource allocated for the retransmission packet is assumed to be a position 3 (i.e., POS 3).

Upon receiving the FI, the MS determines that the previously received packet is a garbage packet, and performs decoding by combining the remaining packets (i.e., a $1^{st}$ sub-packet and a $3^{rd}$ sub-packet) other than the previously received packet.

Operation of exemplary embodiments of the present invention will now be explained in more detail based on the above descriptions. DL communication will be assumed hereinafter.

Figure 8:
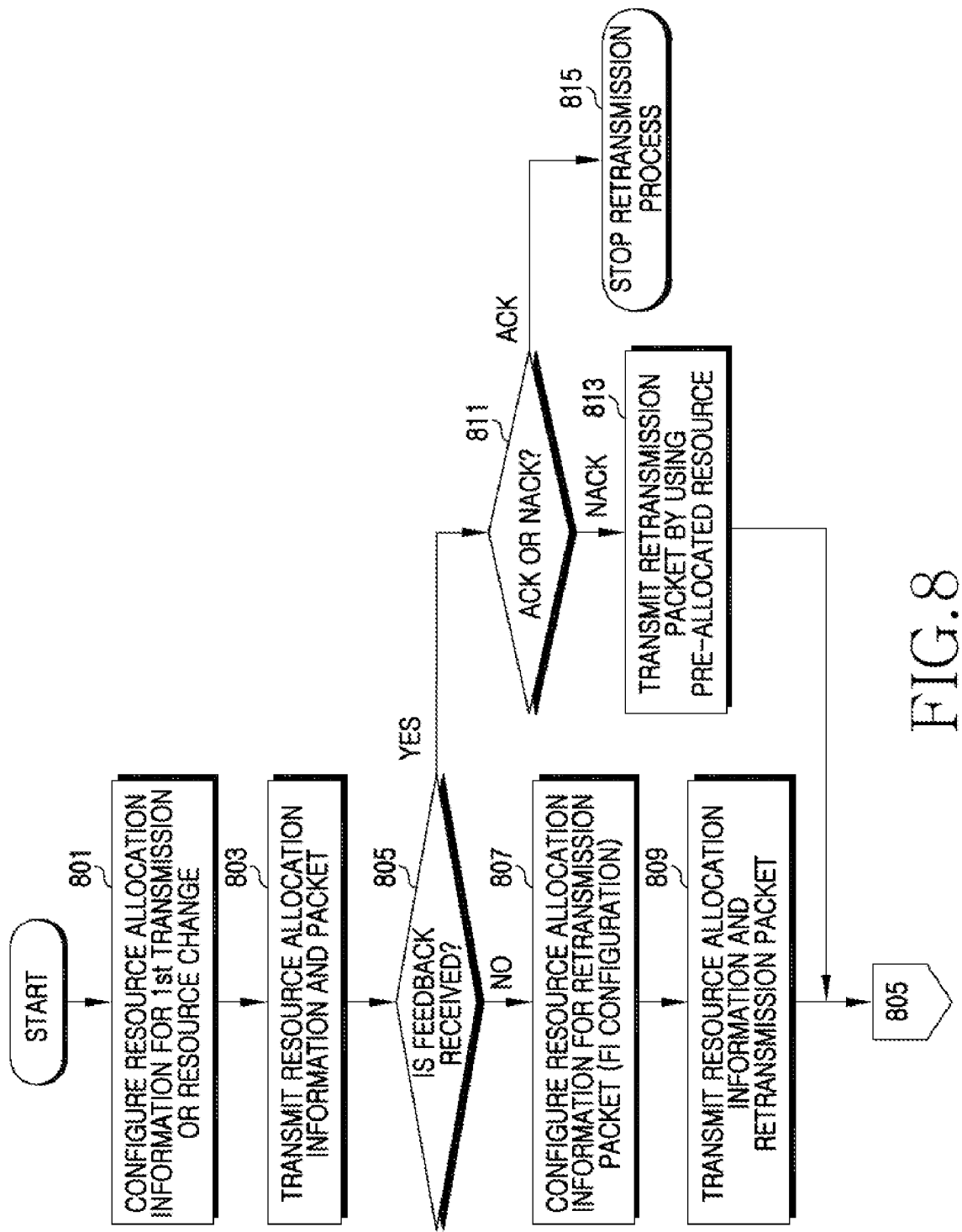
FIG. 8 illustrates a flowchart illustrating a process of performing synchronous HARQ by a Base Station (BS) in a broadband wireless communication system according to an exemplary embodiment of the present invention.

FIG. 8 illustrates a flowchart illustrating a process of performing synchronous HARQ by a BS in a broadband wireless communication system according to an exemplary embodiment of the present invention. In particular, in the process of FIG. 8, a MAP response channel (i.e., an ACKCH) is not used.

Referring to FIG. 8, if it is a $1^{st}$ transmission or if a pre-allocated resource needs to be changed, the BS configures resource allocation information (e.g., MAP IE) regarding a packet to be transmitted at this time in step 801. If it is a 1$^{st}$ transmission, the resource allocation information may include resource information regarding a 1$^{st}$ transmission packet. If the pre-allocated resource needs to be changed, the resource allocation information may include changed resource information.

After configuring the resource allocation information, in step 803, the BS transmits a MAP message including the resource allocation information by using a MAP region, and transmits a corresponding packet at a corresponding position of a data region. In this case, the resource allocation information may be scrambled, masked, or inter-leaved by using a unique code for a corresponding MS, or may be transmitted by being Cyclic Redundancy Check (CRC)-encoded (or CRC-masked).

After transmitting the resource allocation information and the packet, in step 805, the BS determines whether a feedback signal is received from the MS. If the feedback signal is not received through a designated response channel (i.e., an ACKCH), proceeding to step 807, the BS determines packet retransmission and configures resource allocation information for a retransmission packet. In this case, the BS may allow the resource allocation information to include a Fault Indicator (FI) for indicating that the MS has received a garbage packet.

In step 809, the BS transmits a MAP message including the configured resource allocation information by using the MAP region, and transmits a corresponding retransmission packet at a corresponding position of the data region. Thereafter, returning to step 805, the subsequent steps are repeated so that the BS determines whether a feedback signal is received.

If the feedback signal is received through the designated response channel in step 805, proceeding to step 811, the BS determines whether the received feedback signal is an ACK or a NACK. If the feedback signal is a NACK (i.e., retransmission request), proceeding to step 813, the BS transmits a corresponding retransmission packet by using a pre-allocated resource (i.e., a resource for synchronous HARQ), and then the procedure returns to step 805. Otherwise, if the feedback signal is an ACK (i.e., a reception success), proceeding to step 815, the BS stops a retransmission process performed on the packet.

Figure 9:
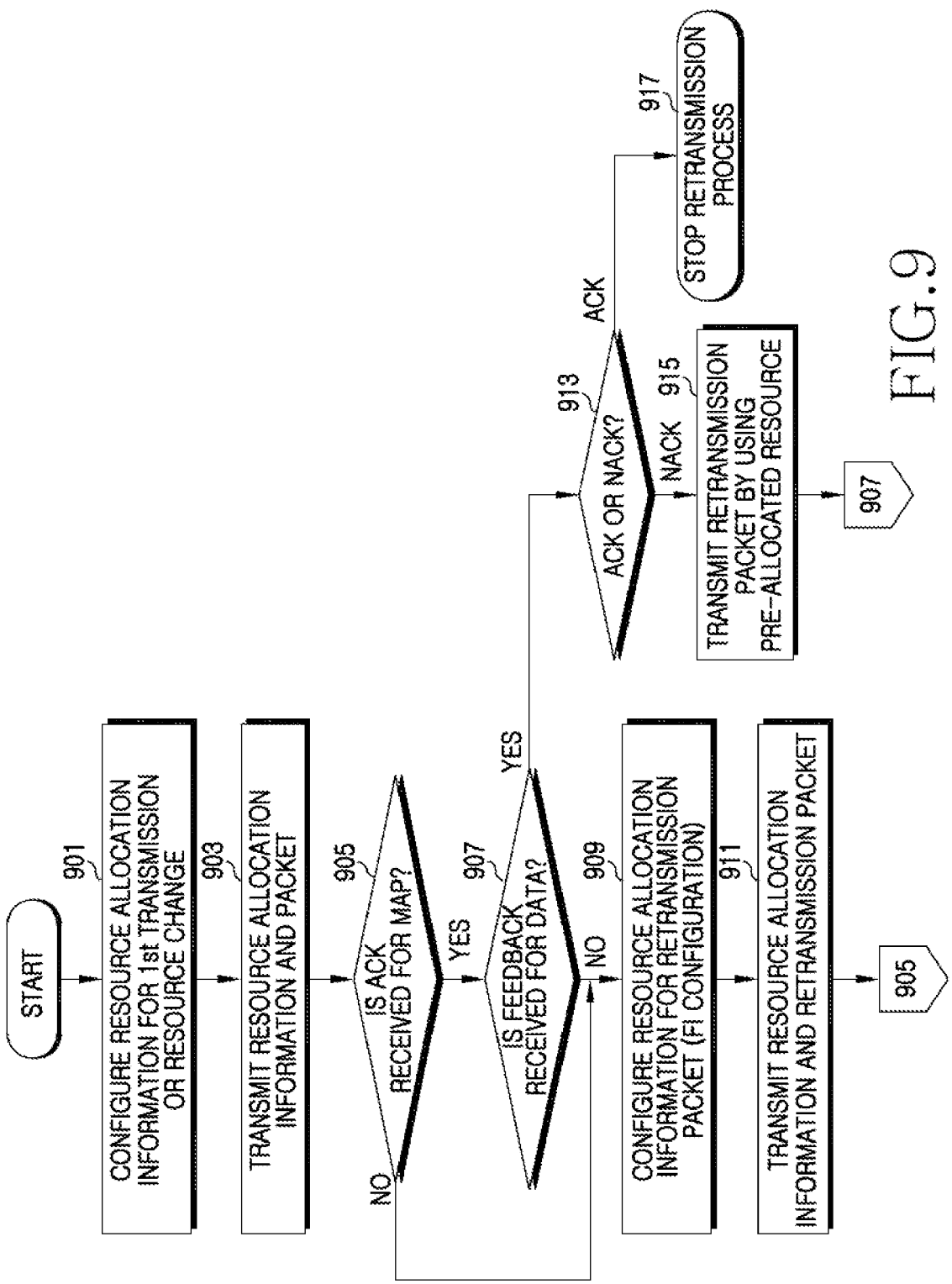
FIG. 9 illustrates a flowchart illustrating a process of performing synchronous HARQ by a BS in a broadband wireless communication system according to an exemplary embodiment of the present invention.

FIG. 9 illustrates a flowchart illustrating a process of performing synchronous HARQ by a BS in a broadband wireless communication system according to an exemplary embodiment of the present invention. In particular, in the process of FIG. 9, a MAP response channel (i.e., an ACKCH) is used.

Referring to FIG. 9, if it is a 1$^{st}$ transmission or if a pre-allocated resource needs to be changed, the BS configures resource allocation information regarding a packet to be transmitted at this time in step 901. If it is a 1$^{st}$ transmission, the resource allocation information includes resource information regarding a 1$^{st}$ transmission packet. If the pre-allocated resource needs to be changed, the resource allocation information includes changed resource information.

After configuring the resource allocation information, in step 903, the BS transmits a MAP message including the resource allocation information by using a MAP region, and transmits a corresponding packet at a corresponding position of a data region. In this case, it is assumed that the resource allocation information may be scrambled, masked, or inter-leaved by using a unique code for a corresponding MS, or may be transmitted by being CRC-encoded (or CRC-masked).

After transmitting the resource allocation information and the packet, in step 905, the BS determines whether a feedback signal is received from the MS through a designated MAP response channel (i.e., a MAP ACKCH). If the feedback signal is not received through the designated MAP response channel, the procedure directly proceeds to step 909.

Otherwise, if an ACK (i.e., a MAP reception success) is received through the designated MAP response channel, proceeding to step 907, the BS determines whether the feedback signal is received through a designated data response channel (i.e., an ACKCH). If the feedback signal is not received through the data response channel, proceeding to step 909, the BS determines packet retransmission and configures resource allocation information for a retransmission packet. In this case, the BS may allow the resource allocation information to include a Fault Indicator (FI) for indicating that the MS has received a garbage packet.

In step 911, the BS transmits a MAP message including the configured resource allocation information by using the MAP region, and transmits a corresponding retransmission packet at a corresponding position of the data region. Thereafter, returning to step 905, the subsequent steps are repeated so that the BS determines whether MAP is fed back.

If the feedback signal is received through the designated response channel in step 907, proceeding to step 913, the BS determines whether the received feedback signal is an ACK or a NACK. If the feedback signal is a NACK (i.e., a retransmission request), proceeding to step 915, the BS transmits a corresponding retransmission packet by using a pre-allocated resource (i.e., a resource for synchronous HARQ), and then the procedure returns to step 907. Otherwise, if the feedback signal is an ACK (i.e., a reception success), proceeding to step 917, the BS stops a retransmission process performed on the packet.

Figure 10:
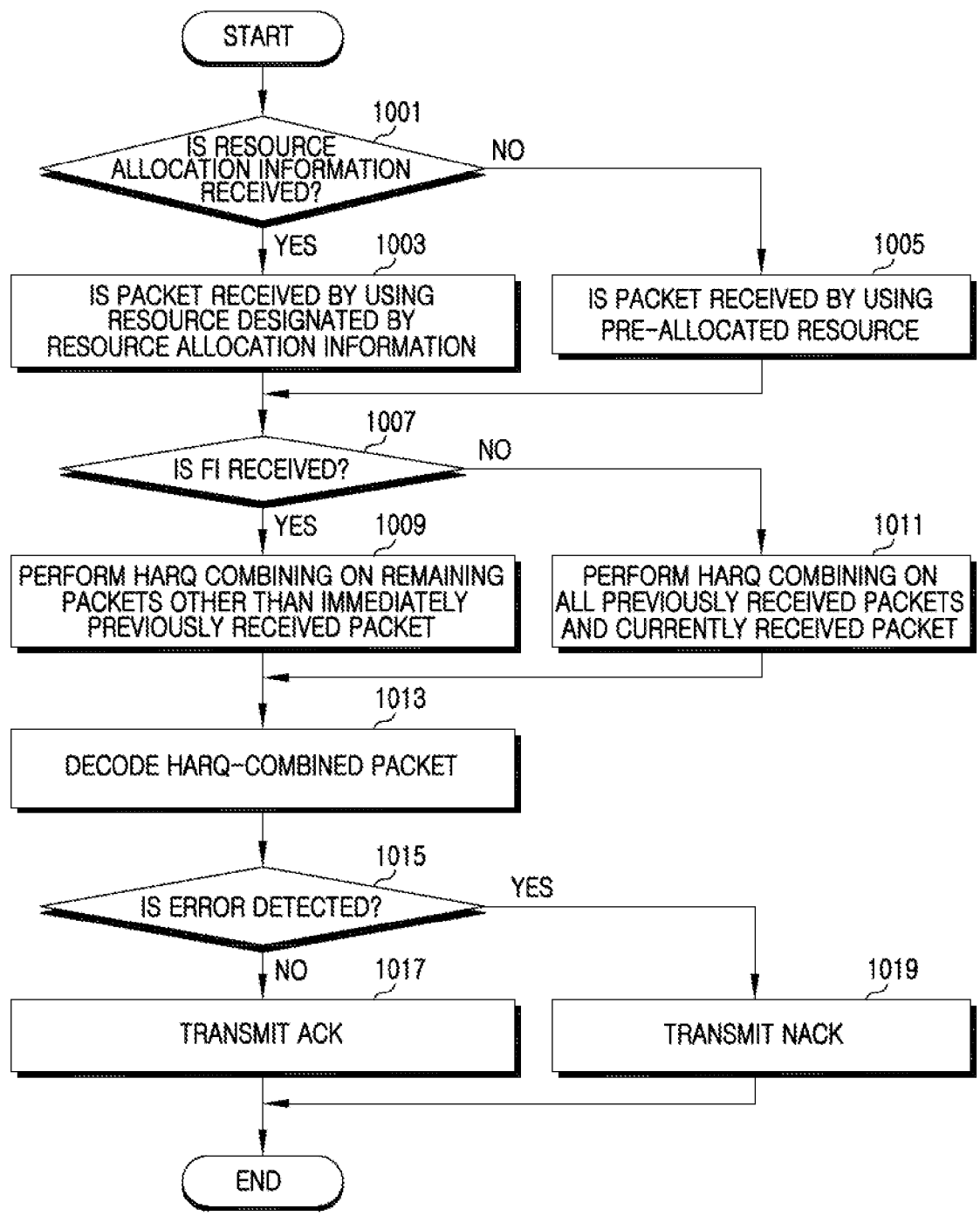
FIG. 10 illustrates a flowchart illustrating a process of performing synchronous HARQ by a Mobile Station (MS) in a broadband wireless communication system according to an exemplary embodiment of the present invention.

FIG. 10 illustrates a flowchart illustrating a process of performing synchronous HARQ by an MS in a broadband wireless communication system according to an exemplary embodiment of the present invention.

Referring to FIG. 10, in step 1001, an MS currently performing synchronous HARQ for DL communication receives and decodes a MAP message in every sub-frame, and determines whether resource allocation information for the MS itself is received.

If the resource allocation information is received, in step 1003, the MS receives a DL packet by using a resource designated by the resource allocation information, and then the procedure proceeds to step 1007. If a MAP response channel (i.e., an ACKCH) is used, the MS may transmit an ACK to a BS through the MAP response channel. If the resource allocation information is not received (i.e., if decoding of the MAP message fails), proceeding to step 1005, the MS receives the DL packet by using a pre-allocated resource (i.e., a resource for synchronous HARQ). Then, the procedure proceeds to step 1007.

In step 1007, the MS determines whether a Fault Indicator (FI) is received from the BS. If the FI is received, proceeding to step 1009, the MS discards an immediately previously received packet, and thereafter performs HARQ combining on the remaining packets (including a currently received packet). In general, the MS performs decoding by performing HARQ combining whenever a retransmission packet is received. In this case, if decoding is successful, the HARQ-combined packet is discarded, and if decoding fails, the HARQ-combined packet is buffered without any change. If the FI is used according to an exemplary embodiment of the present invention, the MS has to have both a 1$^{st}$ combination packet generated by immediately previous HARQ combining and a 2$^{nd}$ combination packet generated by second immediately previous HARQ combining. If the FI is received from the BS, the MS discards the 1$^{st}$ combination packet, and performs decoding by combining the $2^{nd}$ combination packet with a currently received packet. This is because the $1^{st}$ combination packet is a packet in which an erroneously received packet (i.e., an immediately previously received packet) of the MS is combined.

If the FI is not received, proceeding to step 1011, the MS performs HARQ combining on all the previously received packet and the currently received packet. If the $1^{st}$ combination packet and the $2^{nd}$ combination packet are pre-stored, the MS combines the $1^{st}$ combination packet with the currently received packet.

As such, when the HARQ combining is finished, proceeding to step 1013, the MS decodes the HARQ-combined packet. In step 1015, the MS performs CRC checking on the decoding result, and detects an error according to the CRC result. If the error is not detected (i.e., CRC success), proceeding to step 1017, the MS transmits an ACK to the BS through a designated response channel (i.e., an ACKCH). Otherwise, if the error is detected (i.e., a CRC failure), proceeding to step 1019, the MS transmits a NACK to the BS through the response channel.

The aforementioned exemplary embodiment shows a case where a response channel signal is used only once to determine whether the MS receives the control information. In another exemplary embodiment, to increase detection reliability, response channel signals may be combined at least twice to determine whether the MS receives the control information. In a method described below, whether the MS receives previous control information is determined by using response channel signals continuously received at least twice from the MS.

The MS transmits a null to the BS in one of the following cases:

(1) when reception of control information fails and thus a position of response channel (i.e., an ACKCH) resource may not be known; and (2) when the MS recognizes a failure in receiving previous control information.

In case of (2), upon receiving the control information from the BS, the MS determines whether the received control information is for a predicted retransmission packet. If it is not for the predicted retransmission packet, the MS may recognize the failure in receiving the previous control information. For example, if a retransmission packet index (or the number of retransmissions) predicted by the MS is not equal to an index included in the received control information, the MS may recognize the failure of receiving the previous control information. If the reception of the previous control information fails even if the MS has successfully received current control information, the MS transmits a null through the response channel to inform the BS of the failure in receiving the previous control information. In another method, instead of a null, the MS may feed back a predefined indicator (or a specific sequence) through the response channel. In this case, the BS may determine whether the MS fails to receive the control information by detecting the indicator.

Hereinafter, a detection method of the above described case (2) will be described in more detail with reference to the accompanying drawings.

Figure 11:
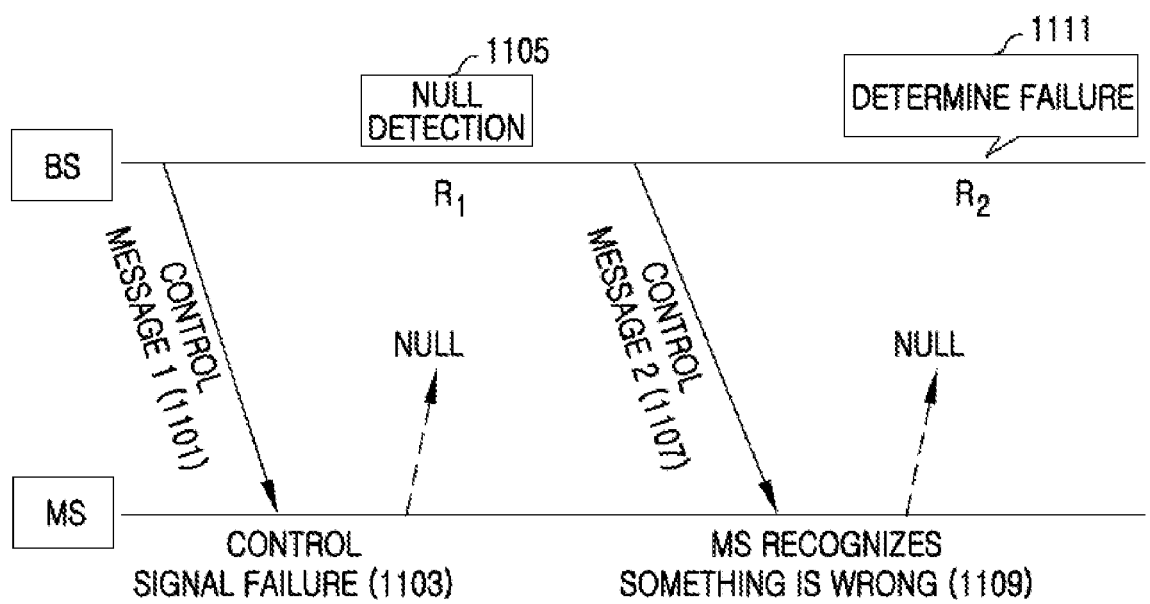
FIG. 11 illustrates a signal exchange process for determining whether an MS receives control information when HARQ is performed in a broadband wireless communication system according to an exemplary embodiment of the present invention.

FIG. 11 illustrates a signal exchange process for determining whether an MS receives control information when HARQ is performed in a broadband wireless communication system according to an exemplary embodiment of the present invention.

Referring to FIG. 11, in step 1101, a BS allocates a resource for a $1^{st}$ transmission or retransmission packet (or subpacket), and transmits a control message 1 including resource allocation information to the MS. Further, the BS transmits the packet to the MS by using the allocated resource.

In step 1103, the MS decodes the control message 1 received from the BS. It is assumed herein that the MS fails to decode the control message. If the reception of the control message fails, the MS may not receive a data packet and may not know a location of a response channel. Thus, no signal may be transmitted through the response channel. That is, a null signal is transmitted through the response channel.

In step 1105, the BS detects a null through the response channel. Upon detecting the null, the BS regards the previous transmission as a failure. In step 1107, the BS allocates a resource for retransmission, and transmits to the MS a control message 2 including resource allocation information. Further, the BS transmits a retransmission packet to the MS by using the allocated resource. When using synchronous HARQ, the control message 2 may not be transmitted.

In step 1109, the MS decodes the control message 2 received from the BS. It is assumed herein that the control message 2 is successfully decoded. In this case, the MS compares a predicted retransmission packet index with an index included in the control message 2. If the two indices do not coincide, the MS recognizes a failure in receiving the previous control message, i.e., the control message 1. Upon detecting the failure in receiving the previous control message, the MS transmits a null signal through the response channel. That is, no signal is transmitted through the response channel. In another example, instead of the null signal, a predefined indicator (or a specific sequence) may be transmitted.

In step 1111, the BS detects a null through the response channel. As such, if the null is detected two or more times by detecting a power level, the BS determines whether the MS fails to receive the control information.

For example, whether the reception of the control information fails may be determined as follows. If conditions of Equation (1) and Equation (2) below are not satisfied, the BS determines that the MS fails to receive a previous control message.

$$\left| \sum_i R_{1,i} \cdot S_{i,NACK} + \sum_i R_{2,i} \cdot S_{i,ACK} \right| > 2TH \qquad (1)$$

In Equation (1) above, $S_{i,NACK}$ denotes a sequence used for NACK transmission, $S_{i,ACK}$ denotes a sequence used for ACK transmission, and i denotes a bit index of a sequence. $R_1$ denotes a signal received through a previous response channel, and $R_2$ denotes a signal received through a current response channel. TH denotes a reference value to be compared with a correlation value between a received signal and a sequence. For example, if the correlation value is greater than the reference value, it can be regarded that the sequence is received.

$$\left| \sum_i R_{1,i} \cdot S_{i,NACK} + \sum_i R_{2,i} \cdot S_{i,NACK} \right| > 2TH \qquad (2)$$

Equation (1) above is for testing whether an ACK is received for the signal $R_2$. If the condition of Equation (1) is satisfied, it is determined that the ACK is received through the response channel. Equation (2) above is for testing whether a NACK is received for the signal $R_2$. If the condition of Equation (2) is satisfied, it is determined that the NACK is received through the response channel.

If neither Equation (1) nor Equation (2) above is satisfied, the BS determines that the MS fails to receive the previously transmitted control message. In this case, the BS may perform an error recovery process by transmitting corresponding control information (or resource allocation information) to the MS. The BS may retransmit to the MS a packet corresponding to the control information of which reception fails.

Figure 12:
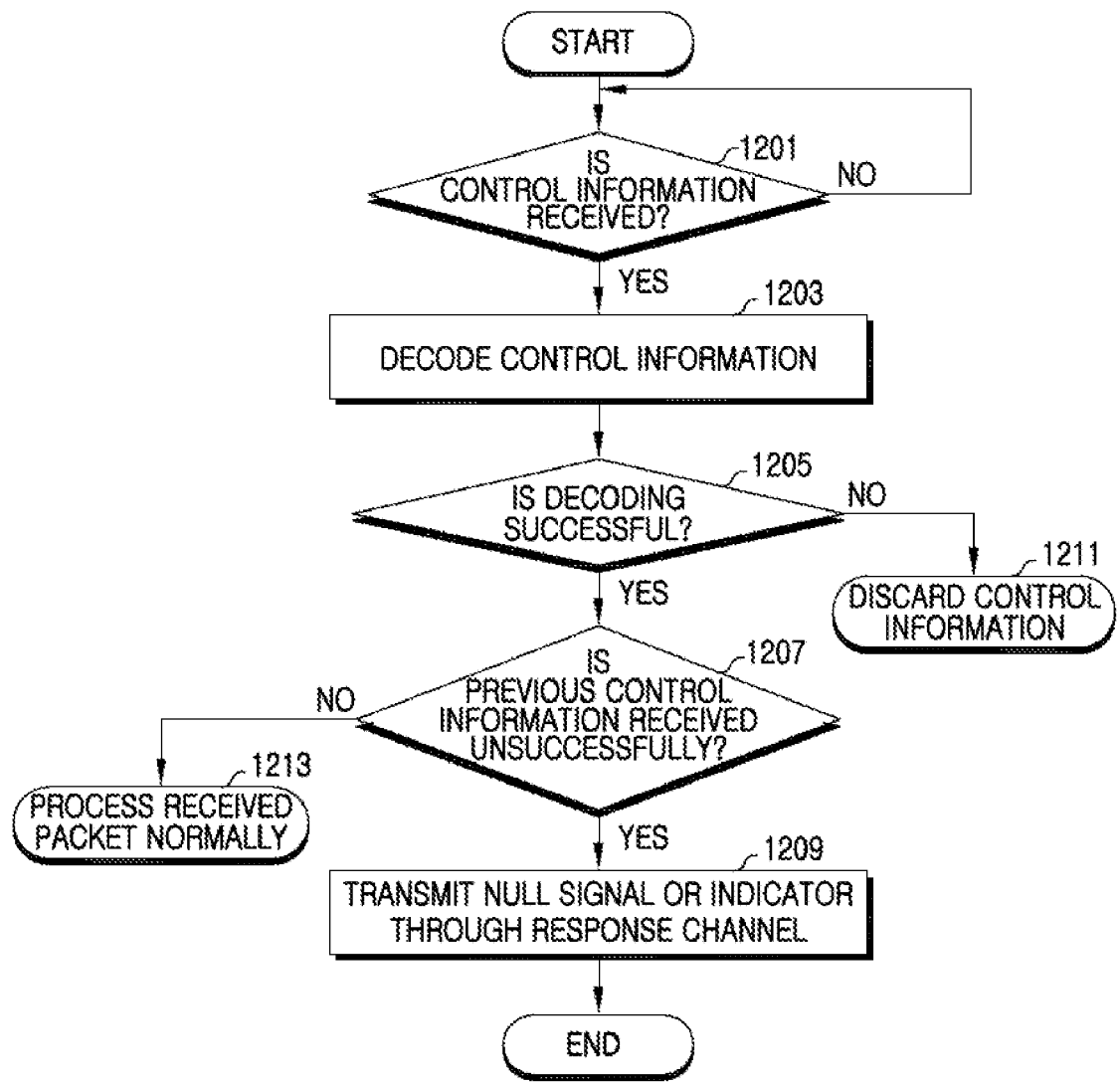
FIG. 12 illustrates a flowchart illustrating a process of performing HARQ by an MS in a wireless communication system according to an exemplary embodiment of the present invention.

FIG. 12 illustrates a flowchart illustrating a process of performing HARQ by an MS in a wireless communication system according to an exemplary embodiment of the present invention. In particular, in the process of FIG. 12, the MS recognizes a failure in receiving previous control information and reports the recognition result to a BS.

Referring to FIG. 12, in step 1201, the MS determines whether a control message (e.g., a MAP message) including HARQ-related resource allocation information (or control information) is received from the BS. Upon receiving the control information, the MS decodes the control information in step 1203. In step 1205, the MS detects an error from the decoded data, and determines whether decoding is successful by using the error detection result. If the decoding of the control information fails, proceeding to step 1211, the MS discards the received control information.

On the other hand, if the decoding of the control information is successful, in step 1207, the MS compares a predicted retransmission packet index (or the number of retransmissions) with an index included in the control information, and determines whether the reception of the previous control information fails. If the two indices are different from each other, the MS determines that the reception of the previous control information fails or the previous control information is lost.

If it is determined that the previous control information is not lost, proceeding to step 1213, the MS processes the received packet normally. Otherwise, if it is determined that the previous control information is lost, proceeding to step 1209, the MS transmits a null signal through a response channel (i.e., an ACK channel) and reports the loss of the previous control information to the BS. In another example, the MS may transmit an indicator (or a sequence) for reporting the loss of the previous control information to the BS through the response channel or another means (e.g., a message).

Figure 13:
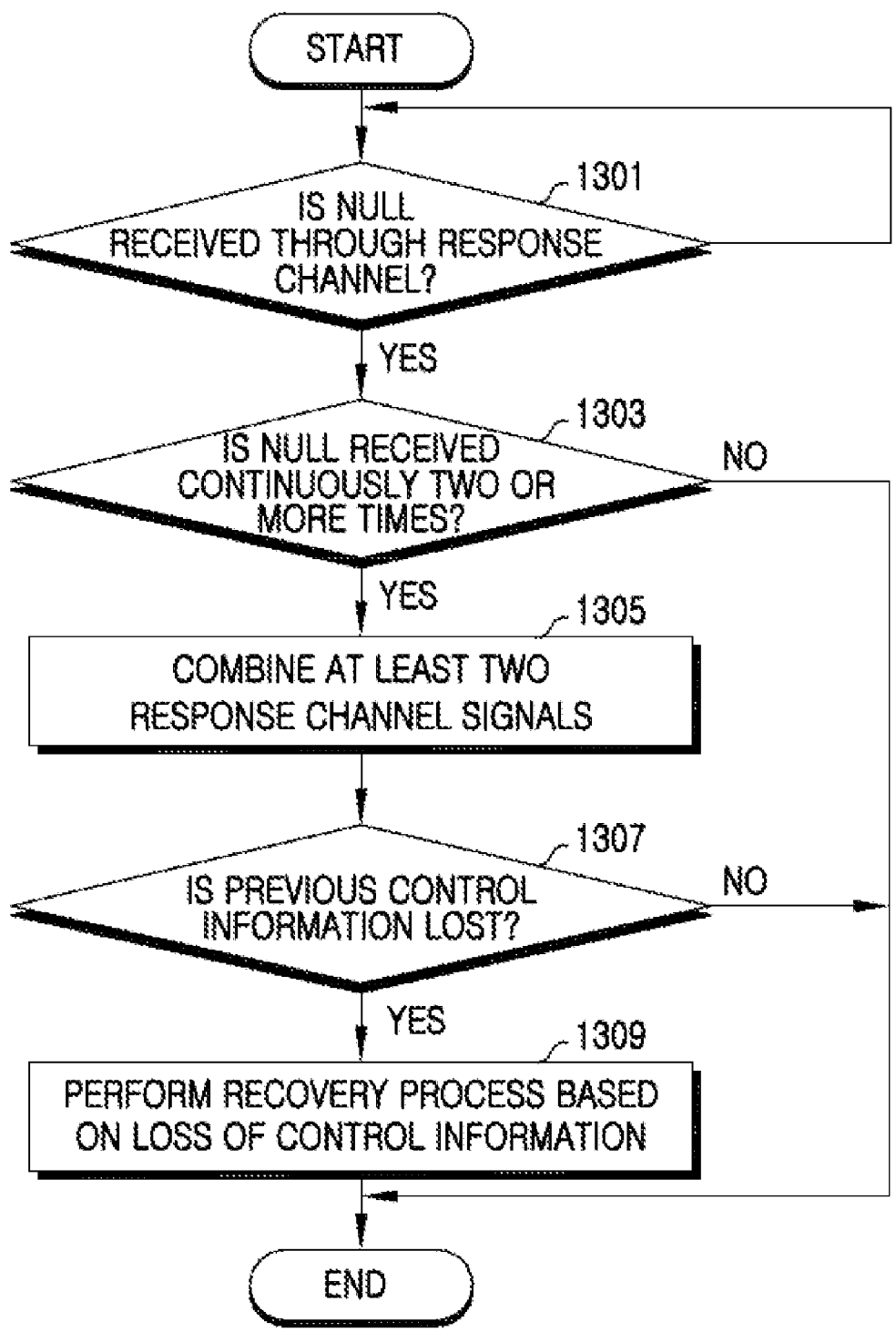
FIG. 13 illustrates a flowchart illustrating a process of performing HARQ by a BS in a wireless communication system according to an exemplary embodiment of the present invention.

FIG. 13 illustrates a flowchart illustrating a process of performing HARQ by a BS in a wireless communication system according to an exemplary embodiment of the present invention. In particular, in the process of FIG. 13, the BS detects a loss of previous control information and then recovers from the loss.

Referring to FIG. 13, in step 1301, the BS determines whether a null is received through an HARQ response channel (i.e., an ACKCH). For example, the BS may compare a correlation value between a received signal and a sequence with a reference value to determine whether the null is received. If it is determined that the null is received, in step 1303, the BS determines whether the null is continuously received two or more times from a corresponding MS.

If the null is continuously received two or more times, proceeding to step 1305, the BS combines at least two received response channel signals. For example, the combining may be performed according to Equation (1) and Equation (2) above.

In step 1307, the BS determines whether the combining result shows that a null is received, and if it is determined that the null is received, the BS determines that previously transmitted control information is lost. That is, the BS determines whether the previously transmitted control information is lost in step 1307.

If the previously transmitted control information is lost, proceeding to step 1309, the BS performs a recovery process based on the loss of the control information. For example, the BS may perform an error recovery process by transmitting the lost control information corresponding to a first null to the MS. In this case, the BS may retransmit a packet corresponding to the lost control information to the MS.

Figure 14:
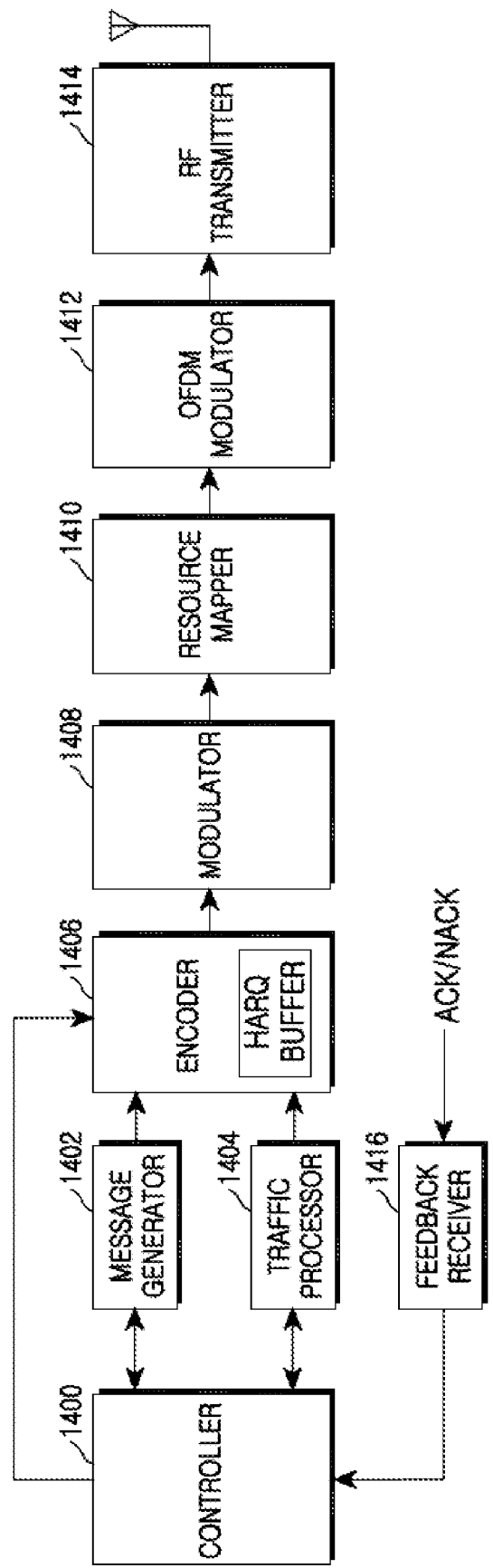
FIG. 14 illustrates a block diagram illustrating a structure of a BS according to an exemplary embodiment of the present invention.

FIG. 14 is a block diagram illustrating a structure of a BS according to an exemplary embodiment of the present invention.

Referring to FIG. 14, the BS includes a controller 1400, a message generator 1402, a traffic processor 1404, an encoder 1406, a modulator 1408, a resource mapper 1410, an OFDM modulator 1412, a Radio Frequency (RF) transmitter 1414, and a feedback receiver 1416. The structure of FIG. 14 focuses mainly on a transmitter. It is assumed that the feedback receiver 1416 is a physical channel receiver for demodulating a fast feedback channel (e.g., an ACKCH, a CQICH, etc.).

The controller 1400 performs resource scheduling, and controls a corresponding constitutional element according to the scheduling result. According to an exemplary embodiment of the present invention, the controller 1400 provides overall control depending on an HARQ operation. That is, the controller 1400 controls generation of a variety of signaling depending on the HARQ operation, and controls packet transmission depending on the HARQ operation. Further, the controller 1400 uses a feedback signal from an MS to predict whether the MS receives control information (e.g., MAP information), and if it is determined that the MS fails to receive the control information, performs a recovery process based on a loss of the control information. For example, the controller 1400 may determine the loss of the control information by receiving a null only once as illustrated in FIG. 3, FIG. 4, and FIG. 7 or may determine the loss of the control information by combining at least two response channel signals as illustrated in FIG. 11.

The message generator 1402 generates various signaling messages under the control of the controller 1400. According to an exemplary embodiment of the present invention, the message generator 1402 generates resource allocation information depending on the HARQ operation. If it is a $1^{st}$ transmission, the resource allocation information includes resource information on a $1^{st}$ transmission packet. If a resource needs to be changed, the resource allocation information may include the changed resource information. Further, if a packet is transmitted since the MS fails to receive the resource allocation information, the resource allocation information may include a Fault Indicator (FI) for indicating that the MS has received a garbage packet. The resource allocation information may be scrambled, masked, or interleaved by using a unique code for a corresponding MS, or may be transmitted by being CRC-encoded (or CRC-masked).

The traffic processor 1404 configures a data burst (i.e., a physical-layer packet) according to a Tx data protocol and delivers the data burst to the encoder 1406.

The encoder 1406 of the physical layer encodes a signaling message from the message generator 1402 and a data packet from the traffic processor 1404 according to a Modulation and Coding Scheme (MCS) level. The encoder 1406 may use a Convolutional Code (CC), a Turbo Code (TC), a Convolutional Turbo Code (CTC), a Low Density Parity Check (LDPC) code, etc. When performing HARQ, the encoder 1406 buffers encoded bits for the data packet in an HARQ buffer. If a retransmission request (i.e., a NACK) is received from a receiving end, the encoder 1406 may select and retransmit the entirety or a portion of the buffered encoded data according to an HARQ scheme (e.g., chase combining, Incremental Redundancy (IR), etc.).

The modulator 1408 generates modulation symbols by modulating the encoded data provided from the encoder 1406 according to the MCS level. For example, the modulator 1408 may use Quadrature Phase Shift Keying (QPSK), 16-Quadrature Amplitude Modulation (QAM), 64-QAM, etc.

The resource mapper 1410 maps data provided from the modulator 1408 to a predefined resource (or subcarrier). If synchronous HARQ is performed according to an exemplary embodiment of the present invention, the resource mapper 1410 maps a $1^{st}$ transmission packet and a retransmission packet to a resource persistently allocated for the synchronous HARQ.

The OFDM modulator 1412 generates OFDM symbols by performing OFDM modulation on the resource-mapped data provided from the resource mapper 1410. The OFDM modulation includes an Inverse Fast Fourier Transform (IFFT) operation, Cyclic Prefix (CP) attachment, etc. The RF transmitter 1414 converts sample data provided from the OFDM modulator 1412 into an analog signal. Further, the OFDM modulator 1412 converts the analog signal into an RF signal and then transmits the RF signal through an antenna.

The feedback receiver 1416 demodulates a feedback signal received through a fast feedback channel, and provides the demodulation result to the controller 1400. According to an exemplary embodiment of the present invention, the feedback receiver 1416 demodulates the feedback signal received through a response channel (i.e., an ACKCH) and provides the demodulated feedback signal to the controller 1400. Further, the feedback receiver 1416 detects a null by combining at least two response channel signals under the control of the controller 1400, and provides the detection result to the controller 1400. If the combining result shows that a null is detected, the controller 1400 determines that previous control information is lost, and may perform a recovery process by transmitting first lost control information to a corresponding MS. The response channel may include a response channel for a data packet or a response channel for control information (i.e., MAP information).

Figure 15:
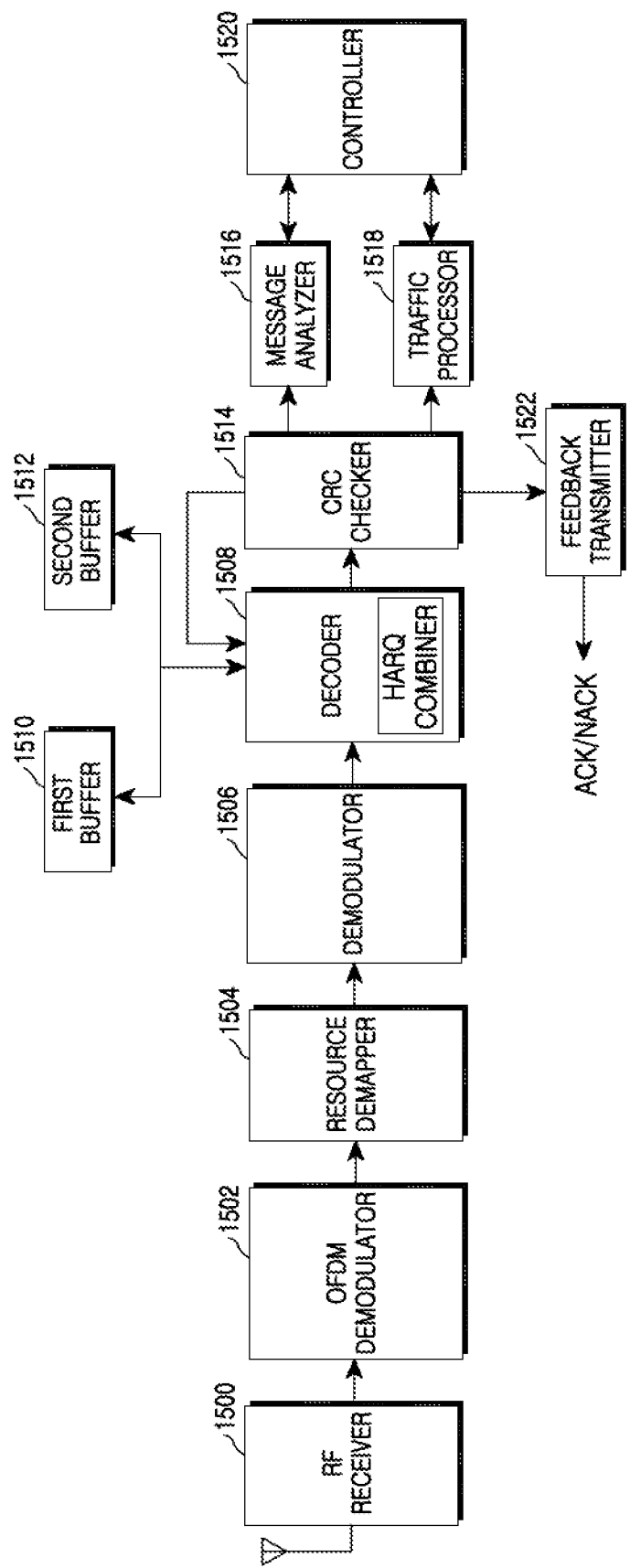
FIG. 15 illustrates a block diagram illustrating a structure of an MS according to an exemplary embodiment of the present invention.

FIG. 15 is a block diagram illustrating a structure of an MS according to an exemplary embodiment of the present invention.

Referring to FIG. 15, the MS includes an RF receiver 1500, an OFDM demodulator 1502, a resource demapper 1504, a demodulator 1506, a decoder 1508, a first buffer 1510, a second buffer 1512, a CRC checker 1514, a message analyzer 1516, a traffic processor 1518, a controller 1520, and a feedback transmitter 1522. The structure of FIG. 15 focuses mainly on a receiver. It is assumed that the feedback transmitter 1522 is a physical channel transmitter for modulating a signal transmitted through a fast feedback channel (e.g., an ACKCH, a CQICH, etc.).

The RF receiver 1500 converts an RF signal received through an antenna into a baseband signal, and converts the baseband signal into digital sample data. The OFDM demodulator 1502 outputs frequency-domain data by performing OFDM demodulation on the sample data provided from the RF receiver 1500. The OFDM demodulation includes CP removal, a Fast Fourier Transform (FFT) operation, etc.

The resource demapper 1504 extracts a to-be-demodulated burst (or packet) from the frequency-domain data provided from the OFDM demodulator 1502. When performing synchronous HARQ, the resource demapper 1504 extracts a packet (i.e., a $1^{st}$ transmission packet or a retransmission packet) mapped to a persistent resource according to the synchronous HARQ.

The demodulator 1506 demodulates the packet provided from the resource demapper 1504. The decoder 1508 decodes the demodulated data provided from the demodulator 1506. If an HARQ-based retransmission packet is received, the decoder 1508 combines the previously received packet with the currently received packet, and then decodes the HARQ-combined packet.

The first buffer 1510 stores a $1^{st}$ combination packet generated by immediately previous HARQ combining. The second buffer 1512 stores a $2^{nd}$ combination packet generated by second immediately previous HARQ combining. Upon receiving a Fault Indicator (FI) from the BS, the traffic processor 1518 discards the $1^{st}$ combination packet, and may perform decoding by performing HARQ combining on the $2^{nd}$ combination packet and the current received packet. If the FI is not received from the BS, the decoder 1508 may perform decoding by performing HARQ combining on the $1^{st}$ combination packet and the currently perceived packet.

The CRC checker 1514 performs CRC checking on the decoded data provided from the decoder 1508, and provides the CRC checking result to the decoder 1508 and the feedback transmitter 1522. Then, the decoder 1508 discards a corresponding HARQ-combined packet according to the CRC checking result or stores the HARQ-combined packet in the first buffer 1510 or the second buffer 1512.

Meanwhile, the feedback transmitter 1522 generates a feedback signal (i.e., an ACK or a NACK) according to the CRC result, modulates the feedback signal, and transmits the modulated feedback signal to the BS through a designated response channel (i.e., an ACKCH). Further, the feedback transmitter 1522 transmits a feedback signal (i.e., an ACK) for control information (i.e., MAP information) to the BS through a designated MAP response channel.

It the CRC checking result shows that there is no error, the CRC checker 1514 delivers the decoded data to a Media Access Control (MAC) layer entity. In this case, if the decoded data is a signaling message, the signaling message is provided to the message analyzer 1516, and if the decoded data is traffic, a corresponding packet is provided to the traffic processor 1518.

The message analyzer 1516 analyzes the received signaling message, and provides the analysis result to the controller 1520. According to an exemplary embodiment of the present invention, the message analyzer 1516 decodes the MAP message to determine existence of resource allocation information (i.e., MAP IE) received by the MS. If the resource allocation information is received, the message analyzer 1516 provides the resource allocation information to the controller 1520. If it is a $1^{st}$ transmission depending on a synchronous HARQ operation, the resource allocation information may include resource information on a $1^{st}$ transmission packet. If a resource needs to be changed, the resource allocation information may include changed resource information. Further, if retransmission occurs when the MS fails to receive the resource allocation information, the resource allocation information may include an FI for indicating that the MS has received a garbage packet. Meanwhile, the resource allocation information may be scrambled, masked, or inter-leaved by using a unique code for a corresponding MS, or may be transmitted by being CRC-encoded (or CRC-masked). In this case, the MS decodes the message received using a MAP region on an IE basis by using the scrambling code, etc. If there is an IE whose decoding is successful, the MS may determine that its resource allocation information is received.

The traffic processor 1518 processes traffic provided from the CRC checker 1514 according to a corresponding protocol.

The controller 1520 provides overall control to the MS. When performing synchronous HARQ, if resource allocation information for a $1^{st}$ transmission is received, the controller 1520 determines a resource designated by the resource allocation information as a persistent resource, and controls an operation for receiving a subsequent retransmission packet by using the persistent resource. The controller 1520 confirms a response channel corresponding to the persistent resource, and controls an operation for transmitting a feedback signal through the response channel. Upon receiving the resource allocation information for changing the persistent resource based on synchronous HARQ, the controller 1520 controls an operation for receiving a subsequent retransmission packet by using a changed resource, and controls an operation for transmitting a feedback signal through a response channel corresponding to the changed resource. Upon receiving an FI from the BS, the controller 1520 controls the decoder 1508 to discard an immediately previously received packet (i.e., a $1^{st}$ combination packet). If a predicted retransmission packet index is different from an index included in the received control information, the controller 1520 controls an operation for transmitting a null through a response channel.

Although an exemplary embodiment of the present invention has been described above for DL communication as an example, the present invention is equally applies to UL communication.

According to exemplary embodiments of the present invention, it is possible to avoid performance deterioration that occurs when an MS fails to receive resource allocation information and resource change information in a case where HARQ is performed in a broadband wireless communication system. That is, by reducing a packet error rate that occurs when the MS fails to receive control information, there is an advantage in that an overall system throughput is improved. While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of performing Hybrid Automatic Repeat reQuest (HARQ) by a Mobile Station (MS) in a wireless communication system, the method comprising:
receiving a control message including resource allocation information;
decoding the control message;
if the decoding is successful, determining whether a previous control message is lost; and
if the previous control message is lost, transmitting one of a null signal and a specific indicator through a response channel,
wherein the null signal and the specific indicator indicate that the previous control message is lost.

2. The method of claim 1, wherein the determining comprises:
comparing a predicted retransmission packet index with an index included in the control message; and
if the two indices are different from each other, determining that the previous control message is lost.

3. The method of claim 1, wherein the specific indicator comprises a specific sequence for indicating a null.

4. The method of claim 1, further comprising, after the transmitting of one of the null signal and the specific indicator, receiving a control message for recovering the loss of the control message from a Base Station (BS).

5. The method of claim 1, further comprising, if the previous control message is not lost:
receiving a data packet by using currently received resource allocation information;
decoding the received data packet;
if the decoding is successful, transmitting an ACKnowledgement (ACK) signal through the response channel; and
if the decoding fails, transmitting a Negative-ACK (NACK) signal through the response channel.

6. A method of performing Hybrid Automatic Repeat reQuest (HARQ) by a Base Station (BS) in a wireless communication system, the method comprising:
determining whether a null signal is received continuously two or more times through a response channel;
if the null signal is received continuously two or more times, combining at least two received response channel signals;
performing a null decision by using the combining value; and
if a null is determined in the null decision, determining that a previously transmitted control message is lost.

7. The method of claim 6, further comprising, if the previously transmitted control message is lost, performing a recovery process based on the loss of the control message.

8. The method of claim 7, wherein the performing of the recovery process comprises transmitting control information corresponding to an initial null signal to a corresponding Mobile Station (MS) among the null signals received continuously two or more times.

9. The method of claim 6, wherein the performing of the null decision comprises determining whether the following two equations are satisfied, and determining a null if neither of the two equations are satisfied, and wherein the two equations are expressed by:

$$\left|\sum_i R_{1,i} \cdot S_{i,NACK} + \sum_i R_{2,i} \cdot S_{i,ACK}\right| > 2TH, \text{ and}$$

$$\left|\sum_i R_{1,i} \cdot S_{i,NACK} + \sum_i R_{2,i} \cdot S_{i,NACK}\right| > 2TH,$$

where $S_{i,NACK}$ denotes a sequence used for Negative-ACKnowledgement (NACK) transmission, $S_{i,ACK}$ denotes a sequence used for ACKnowledgement (ACK) transmission, i denotes a bit index of a sequence, $R_1$ denotes a signal received through a previous response channel, and $R_2$ denotes a signal received through a current response channel.

10. A Mobile Station (MS) apparatus in a wireless communication system, the apparatus comprising:
a receiver for receiving a control message including resource allocation information and for decoding the control message;
a controller for determining whether a previous control message is lost if the decoding is successful; and
a feedback transmitter for transmitting one of a null signal and a specific indicator through a response channel if the previous control message is lost,
wherein the null signal and the specific indicator indicate that the previous control message is lost.

11. The apparatus of claim 10, wherein the controller compares a predicted retransmission packet index with an index included in the control message, and if the two indices are different from each other, determines that the previous control message is lost.

12. The apparatus of claim 10, wherein the specific indicator comprises a specific sequence for indicating a null.

13. The apparatus of claim 10, wherein, after the transmitting of one of the null signal and the specific indicator, the receiver receives a control message for recovering the loss of the control message from a Base Station (BS).

14. The apparatus of claim 10, wherein, if the previous control message is not lost, the receiver receives a data packet by using currently received resource allocation information, and decodes the received data packet.

15. A Base Station (BS) apparatus in a wireless communication system, the apparatus comprising:
 a feedback receiver for determining whether a null signal is received continuously two or more times through a response channel; and
 a controller for combining at least two received response channel signals if the null signal is received continuously two or more times, for performing a null decision by using the combining value, and for determining that a previously transmitted control message is lost if a null is determined in the null decision.

16. The apparatus of claim 15, wherein, if the previously transmitted control message is lost, the controller performs a recovery process based on the loss of the control message.

17. The apparatus of claim 15, further comprising, for the recovery process, a transmitter for transmitting control information corresponding to an initial null signal to a corresponding Mobile Station (MS) among the null signals received continuously two or more times.

18. The apparatus of claim 15, wherein the controller determines whether the following two equations are satisfied, and determines a null if neither of the two equations are satisfied, and wherein the two equations are expressed by:

$$\left| \sum_i R_{1,i} \cdot S_{i,NACK} + \sum_i R_{2,i} \cdot S_{i,ACK} \right| > 2TH, \text{ and}$$

$$\left| \sum_i R_{1,i} \cdot S_{i,NACK} + \sum_i R_{2,i} \cdot S_{i,NACK} \right| > 2TH,$$

where $S_{i,NACK}$ denotes a sequence used for Negative-ACKnowledgement (NACK) transmission, $S_{i,ACK}$ denotes a sequence used for ACKnowledgement (ACK) transmission, i denotes a bit index of a sequence, $R_1$ denotes a signal received through a previous response channel, and $R_2$ denotes a signal received through a current response channel.

* * * * *